(12) United States Patent
Jain et al.

(10) Patent No.: US 9,817,994 B2
(45) Date of Patent: Nov. 14, 2017

(54) SYSTEM AND METHOD FOR INTEGRATING A DATABASE WITH A SERVICE DEPLOYED ON A CLOUD PLATFORM

(71) Applicant: ORACLE INTERNATIONAL CORPORATION, Redwood City, CA (US)

(72) Inventors: Sakshi Jain, Bangalore (IN); Kshitiz Saxena, Karnataka (IN); Shalini Muthukrishnan, Karnataka (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 352 days.

(21) Appl. No.: 14/476,557

(22) Filed: Sep. 3, 2014

(65) Prior Publication Data
US 2015/0120780 A1 Apr. 30, 2015

Related U.S. Application Data

(60) Provisional application No. 61/897,728, filed on Oct. 30, 2013.

(51) Int. Cl.
*G06F 21/62* (2013.01)
*H04L 12/24* (2006.01)
(Continued)

(52) U.S. Cl.
CPC ........ *G06F 21/6227* (2013.01); *G06F 21/604* (2013.01); *H04L 41/02* (2013.01);
(Continued)

(58) Field of Classification Search
CPC ... G06F 21/6227; G06F 21/604; H04L 41/02; H04L 41/5054; H04L 67/1002; H04L 67/2838
See application file for complete search history.

(56) References Cited

U.S. PATENT DOCUMENTS 7,296,022 B2 * 11/2007 Harjanto .......... G06F 17/30607
8,615,731 B2 * 12/2013 Doshi ...................... G06F 8/24
717/106

(Continued)

OTHER PUBLICATIONS

Office Action issued by United States Patent and Trademark Office for U.S. Appl. No. 14/527,307, dated Jun. 23, 2016 (13 pages).

*Primary Examiner* — Huawen A Peng
(74) *Attorney, Agent, or Firm* — Tucker Ellis LLP

(57) ABSTRACT

Described herein are systems and methods for integrating a database into a cloud computing environment. In accordance with an embodiment, a system includes a service management engine (SME) configured to execute in the cloud environment and to access a provider type including coordinates to a database and authentication information for the database. When a service deployed to the cloud environment requests use of a database, the provider type can trigger creation of the database and a schema for use by the associated provider. In accordance with an embodiment, the provider type can include coordinates to a container database (CDB) and authentication information for the CDB. When a service deployed in the cloud environment requests a database, the provider type can trigger creation, via the CDB, of a pluggable database (PDB), with a schema for use by the service.

20 Claims, 17 Drawing Sheets

(51) Int. Cl.
*H04L 29/08* (2006.01)
*G06F 21/60* (2013.01)

(52) U.S. Cl.
CPC ...... *H04L 41/5054* (2013.01); *H04L 67/1002* (2013.01); *H04L 67/2838* (2013.01); *G06F 2221/2141* (2013.01); *H04L 41/5096* (2013.01)

(56) References Cited

U.S. PATENT DOCUMENTS

| | | |
|---|---|---|
| 9,214,090 B2 * | 12/2015 | Hillier ................ G09B 7/04 |
| 2004/0194059 A1 | 9/2004 | Akella |
| 2007/0061798 A1 | 3/2007 | Atsatt |
| 2007/0198475 A1 | 8/2007 | Meduri |
| 2008/0189679 A1 * | 8/2008 | Rodriguez ............ G06F 8/34 |
| | | 717/105 |
| 2009/0265683 A1 * | 10/2009 | Salgar ................ G06F 8/71 |
| | | 717/104 |
| 2009/0276755 A1 | 11/2009 | Beltowski |
| 2011/0078659 A1 | 3/2011 | Stark |
| 2012/0005663 A1 | 1/2012 | Burchart |
| 2012/0117644 A1 * | 5/2012 | Soeder ............ G06F 21/6227 |
| | | 726/22 |
| 2012/0311157 A1 | 12/2012 | Erickson et al. |
| 2014/0012826 A1 | 1/2014 | Wisman et al. |
| 2014/0298332 A1 | 10/2014 | Cai |
| 2014/0344782 A1 * | 11/2014 | Hill ..................... G06F 8/30 |
| | | 717/121 |

\* cited by examiner

SYSTEM AND METHOD FOR INTEGRATING A DATABASE WITH A SERVICE DEPLOYED ON A CLOUD PLATFORM

CLAIM OF PRIORITY

This application claims the benefit of priority to U.S. Provisional application titled "SYSTEM AND METHOD FOR INTEGRATING A CLOUD PLATFORM ENVIRONMENT WITH OTHER ENVIRONMENTS", Application No. 61/897,728, filed Oct. 30, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and providing services within cloud environments, and are particularly related to systems and method for integrating one or more databases accessible to provided services in cloud environments.

BACKGROUND

A cloud computing environment enables responsibilities which previously may have been provided by an organization's own information technology department, to be delivered as service layers within a cloud environment, for use by consumers that are either internal (i.e., private) or external (i.e., public) to the organization. In some instances, a cloud environment can include a PaaS platform component which enables the provisioning of enterprise software applications within the environment. Such applications or services may need access to a database. What is needed, then, are means of integrating a database with a cloud environment. These are examples of the types of environment in which embodiments of the invention can be used.

SUMMARY

Described herein are systems and methods for integrating a database into a cloud computing environment. In accordance with an embodiment, a system includes a service management engine (SME) configured to execute in the cloud environment and to access a provider type including coordinates to a database and authentication information for the database. When a service deployed to the cloud environment requests use of a database, the provider type can trigger creation of the database and a schema for use by the associated provider. In accordance with an embodiment, the provider type can include coordinates to a container database (CDB) and authentication information for the CDB. When a service deployed in the cloud environment requests a database, the provider type can trigger creation, via the CDB, of a pluggable database (PDB), with a schema for use by the service.

DETAILED DESCRIPTION

In accordance with an embodiment, a cloud computing environment enables responsibilities which previously may have been provided by an organization's own information technology department, to be delivered as service layers within a cloud environment, for use by consumers that are either internal (i.e., private) or external (i.e., public) to the organization. Described herein are a variety of hardware and/or software components and features, which can be used in delivering an infrastructure, platform, and/or applications to support cloud computing.

Figure 1:
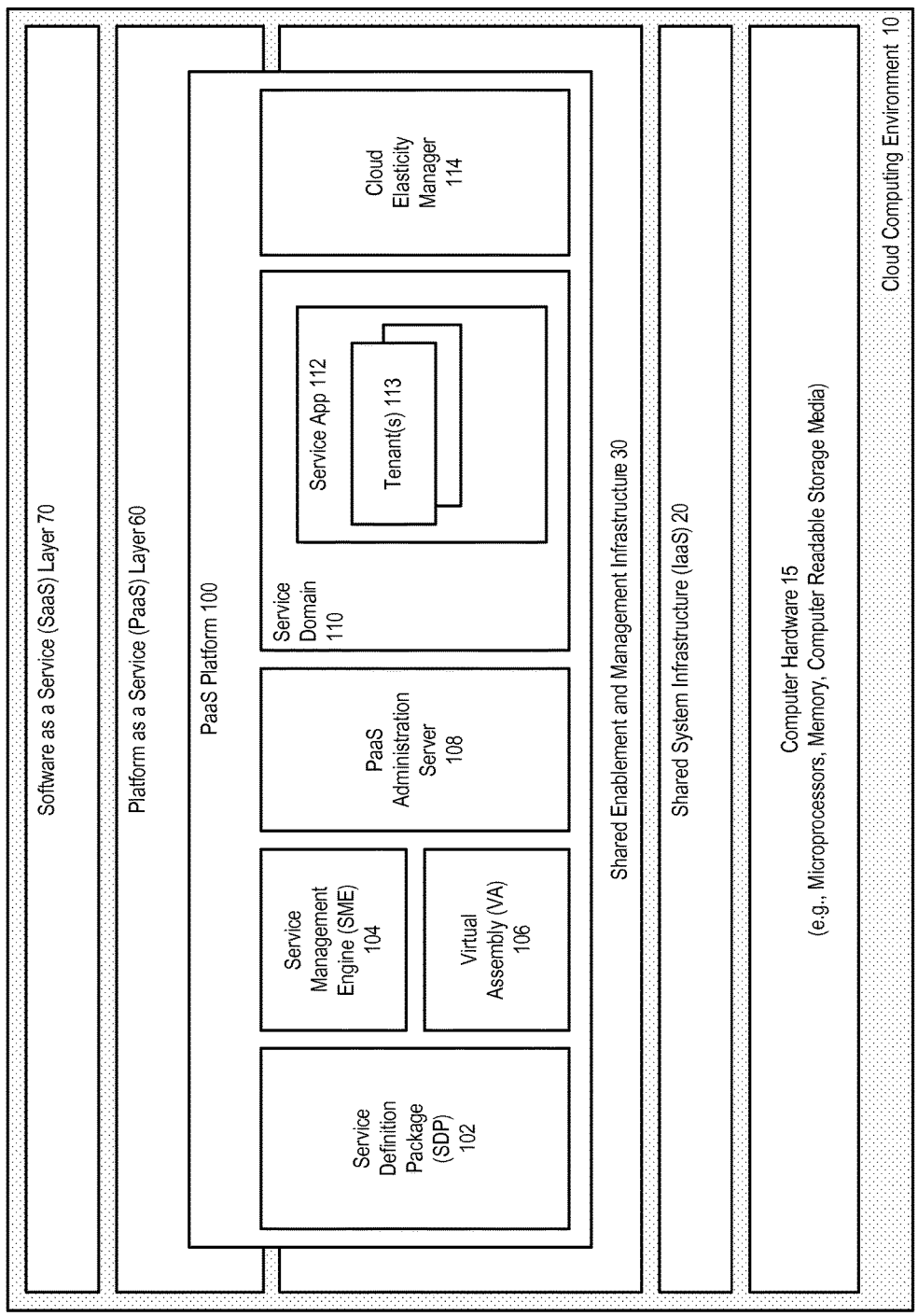
FIG. 1 illustrates a system which can utilize a hybrid service management engine plugin, in accordance with an embodiment.

FIG. 1 illustrates an example of a cloud computing environment, in accordance with an embodiment. As shown in FIG. 1, a cloud computing environment (referred to herein in some embodiments as a cloud environment, or cloud) 10 can generally include a combination of one or more Infrastructure as a Service (IaaS) 20, Platform as a Service (PaaS) 60, and/or Software as a Service (SaaS) 70 layers, which can be delivered as service layers within the cloud environment. The cloud environment can be implemented as a system that includes a computer hardware 15, such as one or more conventional general purpose or specialized digital computers, computing devices, machines, microprocessors, memory and/or computer readable storage media.

In accordance with an embodiment, each of the IaaS, PaaS, and/or SaaS layers can generally include a variety of components. For example, in accordance with an embodiment, the IaaS layer can include a shared database hardware (e.g., an Exadata machine), and/or shared application server hardware (e.g., an Exalogic machine); while the PaaS layer can include one or more PaaS services, such as a database service, application server service, and/or WebCenter service; and the SaaS layer can include various SaaS services, such as enterprise applications (e.g., Oracle Fusion SaaS), and/or ISV or custom applications. The cloud environment can also include a shared enablement and managing infrastructure 30, which provides enablement and management tools that support the various service layers, for example, identity management, virtual assembly builder, system provisioning, tenant management, or other components.

In accordance with an embodiment, the cloud environment can include a PaaS platform component 100 (referred to herein in some embodiments as a PaaS platform, or CloudLogic), which enables the provisioning of enterprise software applications within the environment. For example, the PaaS platform can be provided as an installable software suite that provides a self-service provisioning experience for enterprise applications such as Fusion Middleware (FMW).

As shown in FIG. 1, in accordance with an embodiment, the PaaS platform can include one or more service definition package (SDP) 102, service management engine (SME) 104, virtual assembly (VA) 106, PaaS administration server 108, service domain 110 including one or more service applications (apps) 112 for use by one or more cloud accounts or tenants 113, and/or elasticity manager 114 components.

The example shown in FIG. 1 is provided as an illustration of an exemplary cloud environment and PaaS platform. In accordance with other embodiments, different and/or other types or arrangements of components can be included.

In accordance with an embodiment, the following terms are used herein.

PaaS Platform Component (PaaS Platform, Platform, CloudLogic): In accordance with an embodiment, a PaaS platform component is an installable software suite that provides a self-service provisioning experience for enterprise applications, such as FMW or other enterprise applications.

Site: In accordance with an embodiment, a site is the entity created and configured by the Platform Administrator from a PaaS platform installation, which tenants and Platform Administrators interact with to perform the various operations in the platform. In accordance with an embodiment, a site can be implemented as a WebLogic domain.

Tenant: In accordance with an embodiment, a tenant (referred to herein in some embodiments as an account) is an entity that is associated with users that consume the platform as a service, and establishes an administrative scope that administrators use to access PaaS services. For example, a tenant can be created for an organization, department, or group. Roles such as Tenant Administrator can be associated with a tenant; and quotas can be assigned to a tenant. A tenant can create one or more environments, and have one or more sub-tenants. Consumed resources, such as services with their virtual machines, databases, DNS entries, load balancer and other configurations, can be associated with a tenant.

Sub-tenant: In accordance with an embodiment, a sub-tenant is an entity that exists under a tenant. A sub-tenant has a quota assigned from the overall tenant's quota. For example, a tenant can have one or more sub-tenants, and the Tenant Administrator can assign a quota from the overall tenant quota to each sub-tenant. A sub-tenant can create one or more environments.

Service Definition Package: In accordance with an embodiment, a service definition package (SDP) is a package that contains the information necessary for a particular type of service to be offered by the PaaS platform. For example, each type of FMW service can provide its own SDP. An SDP can contain custom code that is installed into the cloud platform, and a virtual assembly that contains the topology and configuration of a set of virtual appliances that will comprise a running instance of the service, upon being deployed onto a set of virtual machines (VMs).

Service Management Engine: In accordance with an embodiment, a service management engine (SME) provides a generic means to plug any service type into the system. For example, an SME takes care of the service-specific provisioning, lifecycle, management, and monitoring support for a service type or provider type.

Service Type: In accordance with an embodiment, a service type is a representation of software functionality that can be instantiated within the PaaS platform site for a tenant. A service type is created based on an SDP, with additional configuration information supplied by the Platform Administrator. Some of this configuration information may supply values that are specific to an installation of the PaaS platform product or the enterprise in which it is running; while some configuration information may reflect the Platform Administrator's choices of options supported by the SDP. Multiple service types can be created from a single SDP, by making different configuration choices.

Environment: In accordance with an embodiment, an environment is a collection of services and their associated providers that are managed together as a group. An environment can be created for the purpose of running an application or providing some higher level service. Environments provide the ability to operate on the collection of services as a whole, with operations such as start, stop, backup, and destroy. An environment provides the functions of an association group, and a management group.

Service: In accordance with an embodiment, a service is an instantiation of a service type. An environment can be associated with multiple services; and within a particular tenant there can be one or more environments with multiple services for a single service type. Typically, a service provides both a service administration interface, and an end-user interface. A service can be associated with identity, database, or other service features that are required by the service; and with a service runtime that runs on one or more VMs.

Provider Type: In accordance with an embodiment, a provider type is a special form of service type that supports providers instead of services. Provider types are created by the Platform Administrator in the same way as service types. As with service types, a provider type is created based on an SDP, with additional configuration information supplied by the Platform Administrator. Some of this configuration information may supply values that are specific to this installation of the PaaS platform product or the enterprise in which it is running; while some configuration information may reflect the Platform Administrator's choices of options supported by the SDP. Multiple provider types can be created from a single SDP, by making different configuration choices.

Provider: In accordance with an embodiment, a provider is a specialization of a service. Unlike services, which are created by explicit action of a Tenant Administrator, providers are created on-demand to satisfy the dependencies of services. A provider is an instantiation of a provider type, and represents the use of the resource managed by the provider type by a particular instance of a service type. Services can be associated with multiple providers. When creating a service, an orchestration engine matches the requirements of a service type with the capabilities of the configured provider types, and then requests the service type to create an instance of a service, and the provider types to create instances of the providers for use by this instance of the service. The orchestration engine then associates the service with the providers.

Association Resource: In accordance with an embodiment, an association resource (sometimes referred to as a provider resource) enables a service to keep track of configuration information for a particular association. For example, if a Java Service is associated with two different database providers, it may need to create a connection pool for each database. The association resource enables the Java Service to keep track of which connection pool is associated with which database, so that, if the orchestration engine needs to change one of the associations, the Java Service will know which connection pool to change.

Runtime: In accordance with an embodiment, a runtime is a representation of the installed and operational software that provides the functionality of a service or a provider. Runtimes are managed by the custom code included in an SDP, in some instances using facilities provided by the PaaS platform, such as its virtualization and provisioning support. Runtimes can be layered, with each layer being shared (multi-tenant), or not shared (dedicated). For example, with a Java Service, the runtime layers may include an application server, a Java virtual machine (JVM), a guest operating system (OS), and a host operating system. When unqualified, the expression "service runtime" generally refers to the top-most layer. For example, a multi-tenant service runtime is a runtime that is shared by multiple services; while a dedicated service runtime is a runtime that is not shared among multiple services.

Service Resource Type: In accordance with an embodiment, a service resource type is a special form of service type that supports service resources instead of services. Service resource types are created by the Platform Administrator in the same way as service types. As with service types, a service resource type is created based on an SDP, with additional configuration information supplied by the Platform Administrator. Multiple service resource types can be created from a single SDP, by making different configuration choices.

Service Resource: In accordance with an embodiment, a service resource is a specialization of a service. Unlike services, which are created by explicit action of a Tenant Administrator, and providers which are created on-demand to satisfy the dependencies of services, service resources are associated with services to satisfy the dependencies of artifacts/applications deployed to services. A service resource can be associated, or disassociated, with a service after the service has been created. A service resource dependency of a service is optional and may be configured by the Platform or Tenant Administrator based on the needs of the artifacts/applications that would be deployed to the service. For example, a service may indicate support for multiple kinds of service resource dependencies; and the Platform or Tenant Administrator may associate multiple service resources for a dependency. A service resource is an instantiation of a service resource type, and represents the use of the infrastructure managed by the service resource type, by a particular instance of a service type. A Service can be associated with one or more service resources. The association of a service to a service resource can happen at any time in the lifecycle of the service, once the service and service resource have been created.

Quota: In accordance with an embodiment, a quota provides a mechanism to limit consumption of a resource, by establishing an upper bound on the resource usage. Examples of quota-controlled resources include CPU, disk, and the number of VMs in use. PaaS layer quotas can also be supported, for example the number of services that can be provisioned. Quotas can be assigned to tenants, and a Tenant Administrator can allocate their quota to projects or groups which they manage.

Namespaces: In accordance with an embodiment, the PaaS platform can use a naming hierarchy, such as a Nimbula-style naming hierarchy and multipart naming scheme. There can be reserved namespaces for SDPs, service-types, provider-types, service-resource-types, service-resources, environments, and services. Namespaces can be defined and reserved at the global level, and per tenant.

Platform Administrator/System Administrator (Role): In accordance with an embodiment, a Platform or System Administrator is responsible for installing, configuring, managing, and maintaining the PaaS platform infrastructure and environment, including the resources that are made available to applications running in the environment. The Platform or System Administrator is also responsible for downloading and installing SDPs to support additional service types, setting up or configuring virtualization technology for the platform to use, and installing and configuring providers.

Cloud Account Administrator (Role): In accordance with an embodiment, a Cloud Account Administrator is responsible for the provisioning of new services, management of generic service properties such as their Quality of Service (QoS) settings and their associations, and the locking and termination of services. A Cloud Account Administrator can assign Service Administrators for each service.

Tenant Administrator (Role): In accordance with an embodiment, a Tenant Administrator is responsible for creating sub-tenants and assigning Tenant Administrator to the sub-tenant groups, and for the provisioning of new services, management of generic service properties, and the locking and termination of services. A Tenant Administrator can assign Service Administrators for each service.

Service Administrator (Role): In accordance with an embodiment, a Service Administrator is responsible for administering and managing a specific service after it has been provisioned. A Service Administrator interacts with the service's administration interface to perform administration and management operations.

Service Runtime Administrator (Role): In accordance with an embodiment, a Service Runtime Administrator is responsible for configuring and managing service runtimes.

Application Deployer (Role): In accordance with an embodiment, an Application Deployer deploys an application to the provisioned service, and is responsible for installing, configuring, and running the application. Once the application is running, it can be made available to an End User.

End User (Role): In accordance with an embodiment, an End User is the user of the applications that are deployed to the service. The End User interacts with the user interface provided by the application running in the service. If the service itself provides an interface for users to consume the functionality that it exposes, then the End User can use that service's interface.

Figure 2:
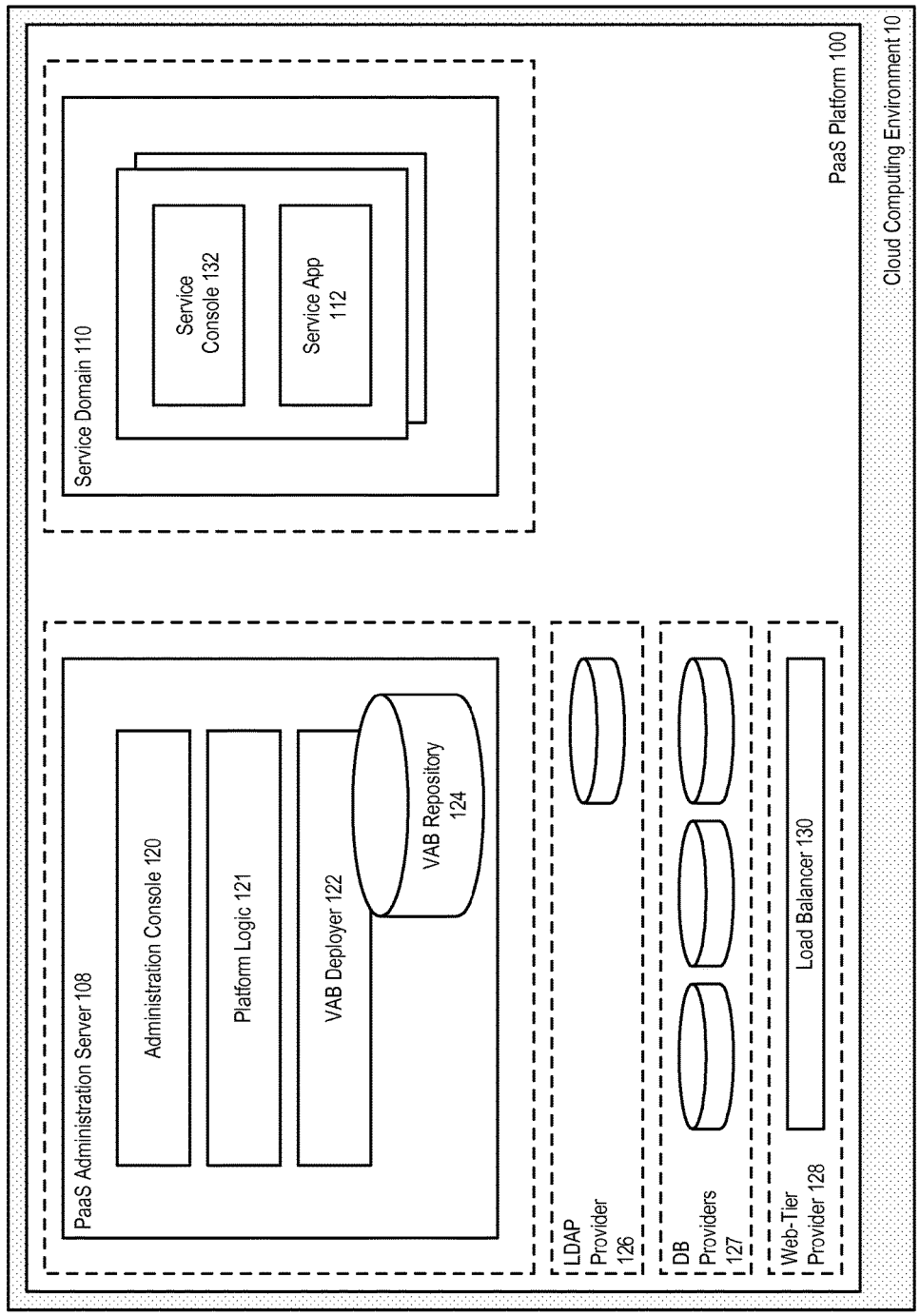
FIG. 2 illustrates a PaaS platform component, including an administration server and a service domain, in accordance with an embodiment.

FIG. 2 illustrates an administration server and a service domain, in accordance with an embodiment. As shown in FIG. 2, in accordance with an embodiment, the PaaS platform (platform) comprises a PaaS administration server 108, which supports an administration console 120, cloud platform provisioning/management logic 121, and virtual assembly builder (VAB) deployer 122, together with a virtual assembly or VAB repository 124. The VAB deployer can be provided by functionality, components, or products such as Oracle Virtual Assembly Builder (OVAB). The VAB deployer (e.g., OVAB Deployer) can then be used by the platform to manage those VMs that will host the servicing applications.

In accordance with an embodiment, the PaaS administration server can be implemented as a WebLogic (WLS) server application, together with, e.g., Glassfish modules embedded therein to provide cloud platform functionality. A service domain, including a service app and service console 132, can be provided for housing enterprise applications, such as FMW applications, that will ultimately service user requests. In accordance with an embodiment, the service domain components may be instantiated multiple times as part of provisioning requests.

In accordance with an embodiment, provider server types that will be used by the PaaS administration server and the service domain, examples of which include LDAP 126, database 127, and Web tier 128 or load-balancer 130 providers, can be provided in pools that are not provisioned by the administration server, but are external services registered with the cloud environment. In accordance with an embodiment, the PaaS platform can make use of a load-balancer provider to forward all incoming, e.g., Web requests, that are directed to the services. For example, each service can be associated with a virtual host name that will be registered with the load-balancer provider during service provisioning.

Figure 3:
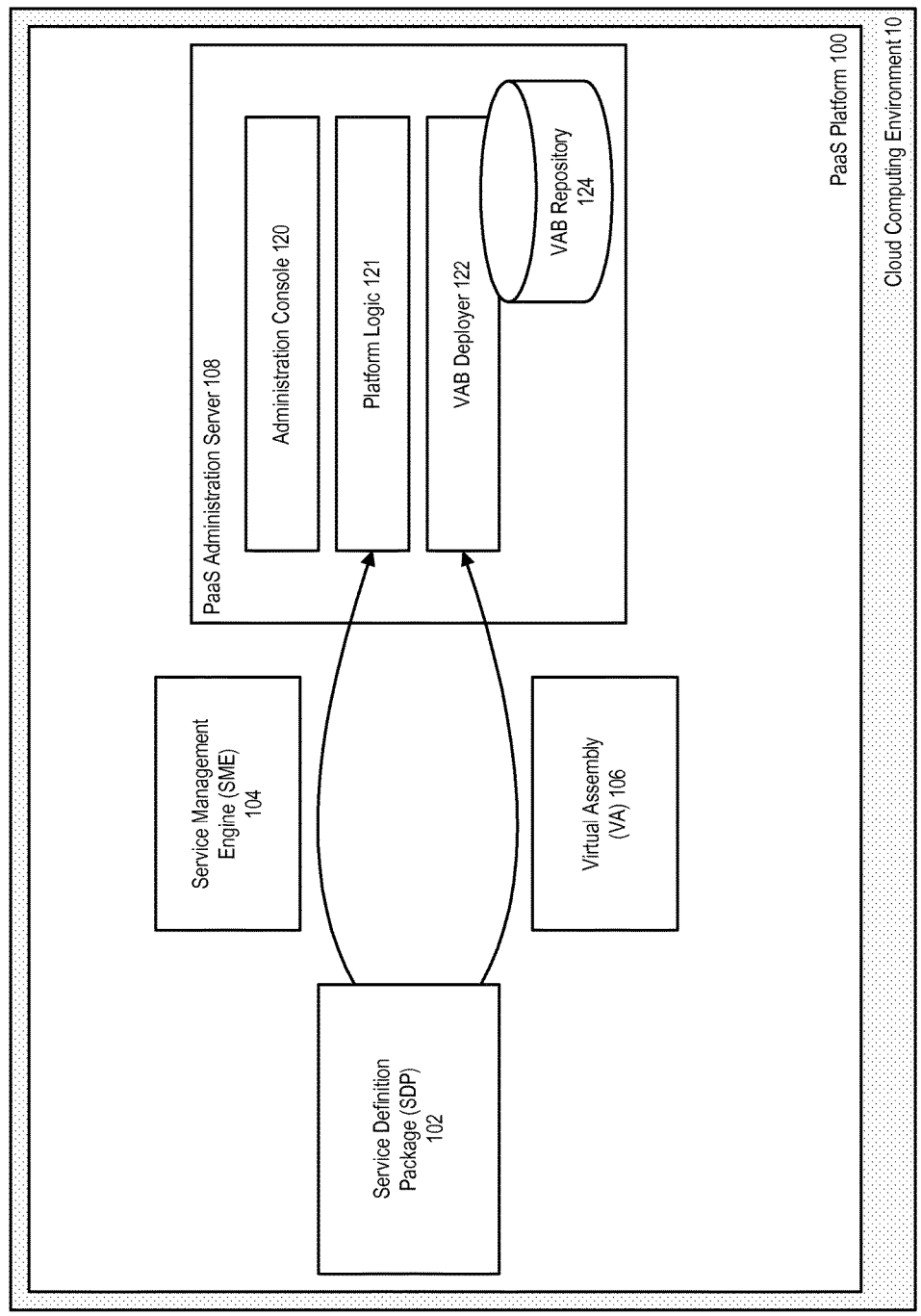
FIG. 3 illustrates the use of service definition packages and service management engines with an administration server, in accordance with an embodiment.

FIG. 3 illustrates the use of service definition packages and service management engines with an administration server, in accordance with an embodiment. As shown in FIG. 3, in accordance with an embodiment, new enterprise application service types (e.g., new FMW service types), which the administrator wishes to make available for use within the PaaS platform, can be installed from an SDP. Each SDP contains custom code that can be injected into the platform, for use in supporting, e.g., elasticity and provisioning; together with a virtual assembly (e.g., an OVAB assembly) that contains the topology and configuration of a set of virtual appliances that will comprise a running instance of the enterprise application service, once the assembly is deployed onto a set of VMs.

Figure 4:
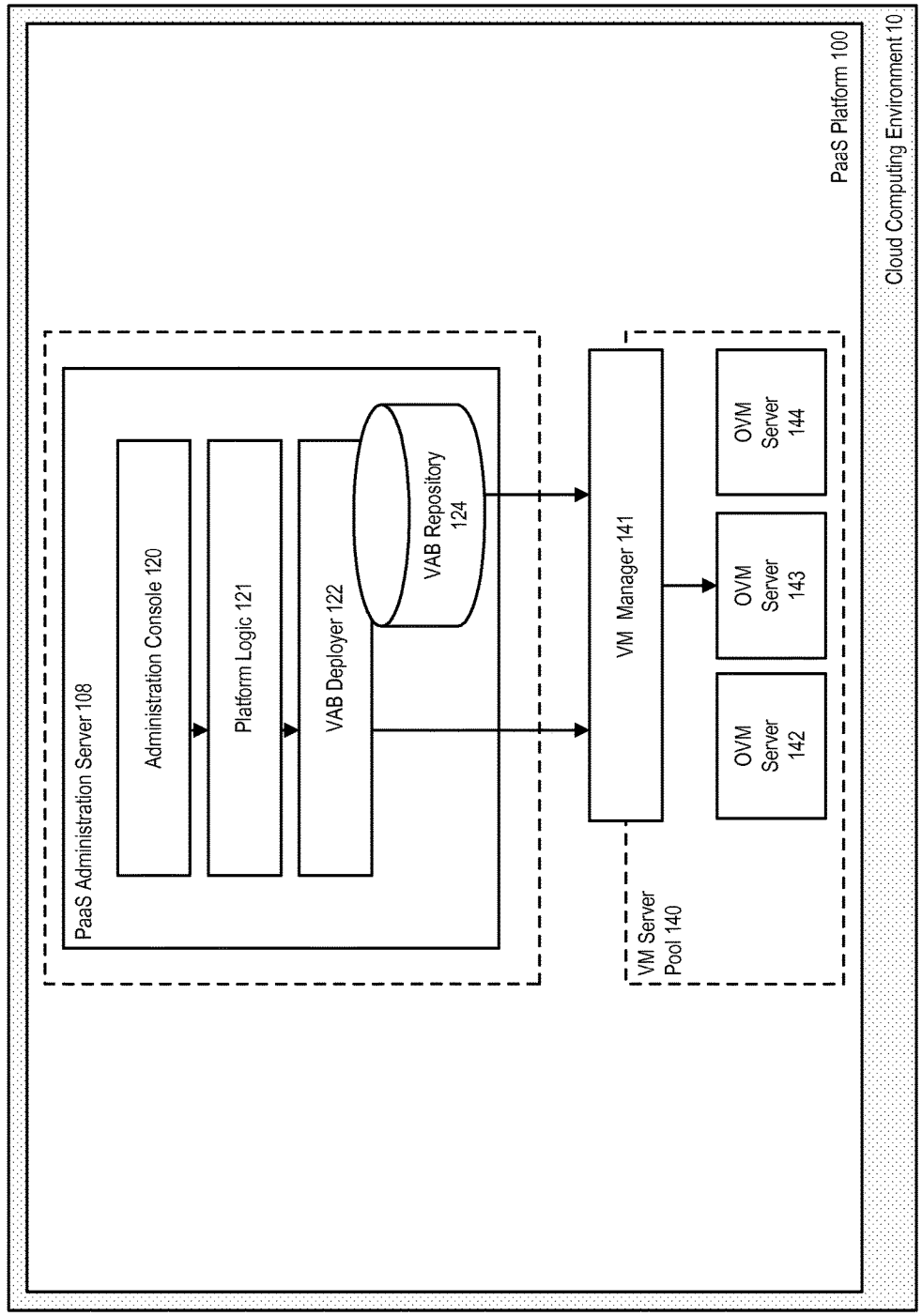
FIG. 4 illustrates the interaction between an administration server and a virtualization manager, in accordance with an embodiment.

FIG. 4 illustrates the interaction between an administration server and a virtualization manager, in accordance with an embodiment. As shown in FIG. 4, in accordance with an embodiment, a VM manager component 141 (e.g., Oracle's OVM Manager) can be used by the PaaS platform to manage the pool 140 of VMs 142, 143, 144, which are then used in instantiating a service assembly. When a request is made from a platform module to instantiate an assembly, or a single appliance in the case of a scale-up request, the VAB deployer application (e.g., OVAB Deployer) can interact with the VM manager to fulfill the request. By delegating the infrastructure/virtualization responsibilities to the VM manager and VAB deployer in this manner, the platform can be abstracted from the target deployment platform.

Figure 5:
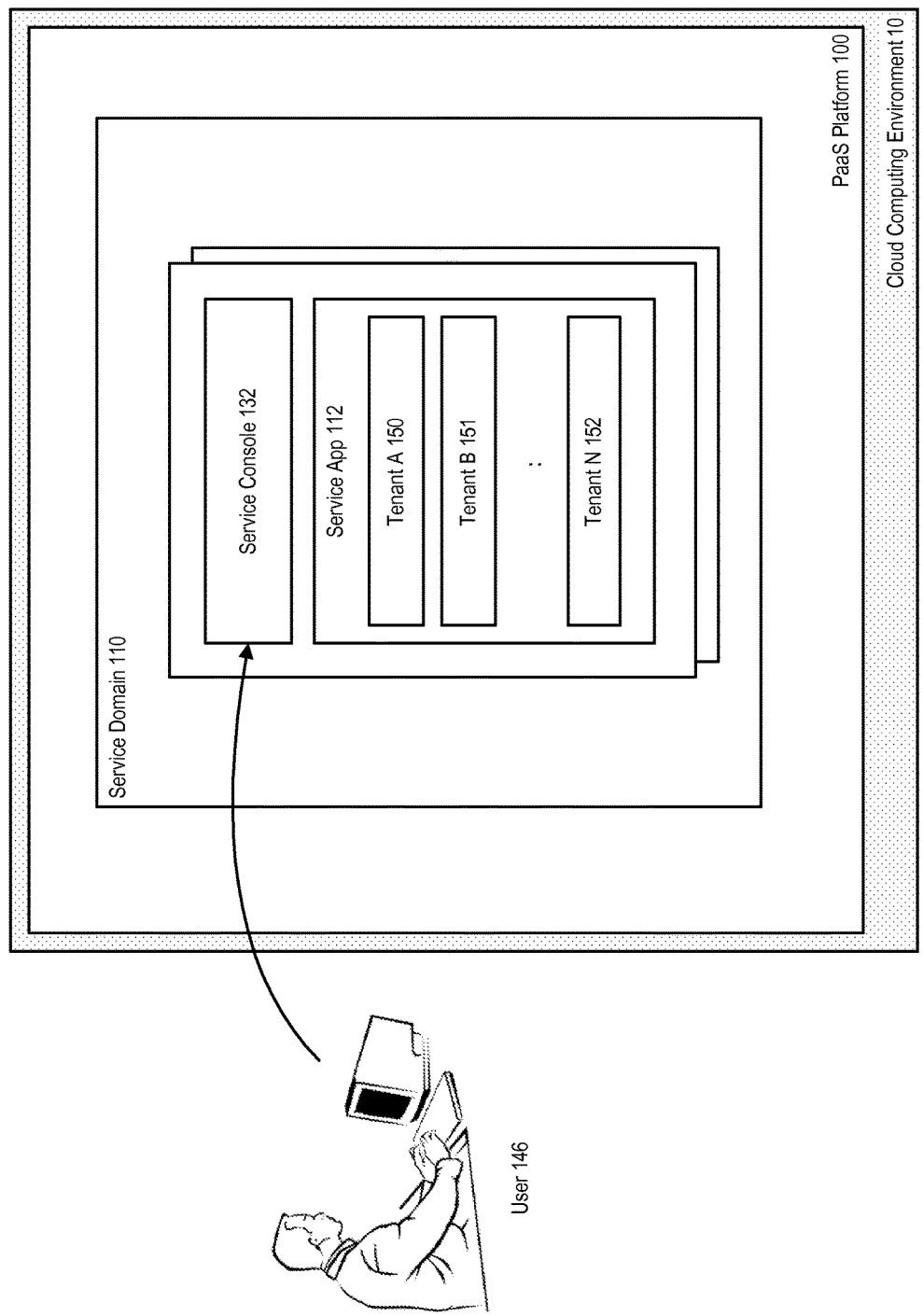
FIG. 5 illustrates a multiple tenant service domain, in accordance with an embodiment.

FIG. 5 illustrates a multiple tenant service domain, in accordance with an embodiment. As shown in FIG. 5, in accordance with an embodiment, a service domain can include multiple tenants 150, 151, 152, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications—these models are instead referred to as using "multitenant" and "dedicated" resources. Alternatively, applications may share resources in a manner that is part of the logical model of the applications; for example, two applications may purposely access a shared database because they intend to operate on the same data—these models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner, during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support a particular tenancy mode; service applications that are not multitenant will only be able to support a single account for each service instance. Once a service has been instantiated from its VM assembly, end users 146 can interact with the system and the instantiated services, in the same manner as they would interact with an on-premise version of that service.

Figure 6:
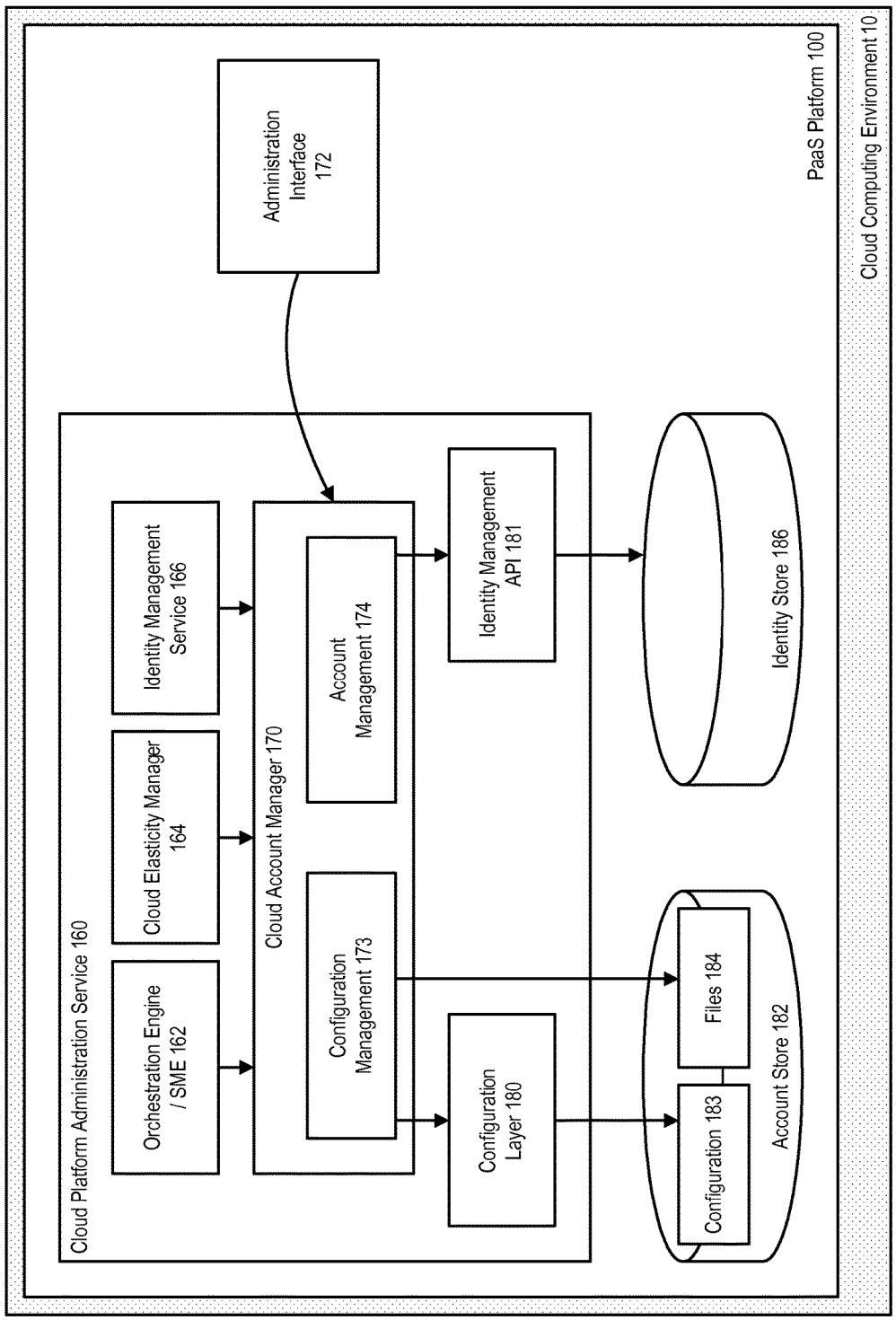
FIG. 6 illustrates a cloud account manager, in accordance with an embodiment.

FIG. 6 illustrates a cloud account manager, in accordance with an embodiment. As shown in FIG. 6, in accordance with an embodiment, the PaaS platform can include a cloud platform administration service (CPAS) 160, together with a cloud account manager 170 which supports functions such as account management, and provides a framework that other modules, such as the orchestration engine/SMEs 162, cloud elasticity manager (CEM, referred to herein in some embodiments as an elasticity manager) 164, or identity management service 166), can use to access account-specific data. A configuration management component 173 can use a configuration layer 180 to persist account specific configuration 183 and other files 184 to an account store 182. An account management module 174 provides the ability to manage accounts for a CPAS domain, which can be exposed through the use of a command-line, REST, or other identity management application program interface (API) 181.

In accordance with an embodiment, users can either be managed within an identity store 186 managed by the PaaS platform, or alternatively can be provided from an external, e.g., corporate LDAP, or other means of user identification; and can access the cloud account manager through an administration interface 172. Account and configuration data can also be stored on a file system or other means of storage that is accessible from nodes of a CPAS cluster.

Service Definition Package (SDP)

Figure 7:
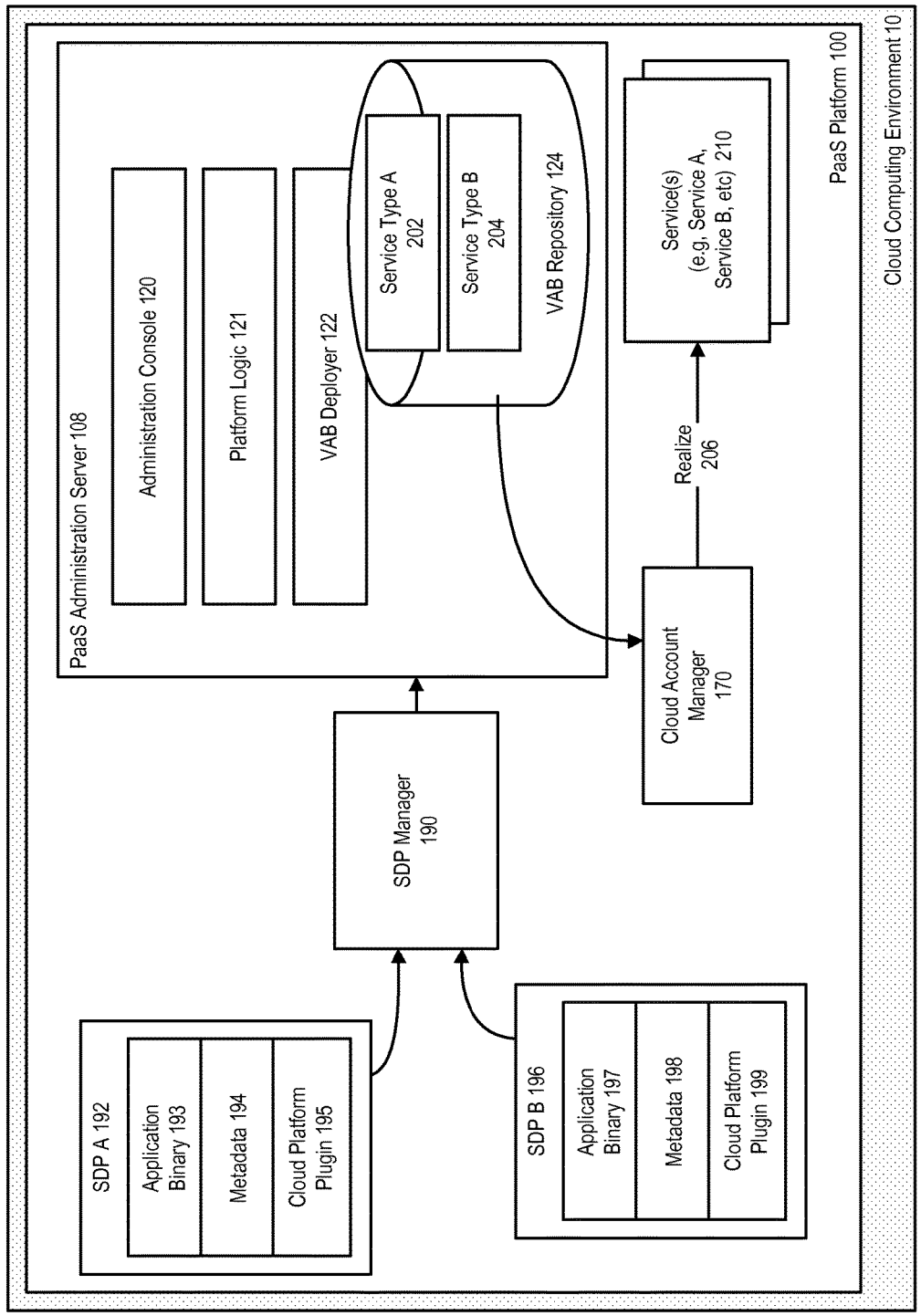
FIG. 7 illustrates the use of a service definition package, in accordance with an embodiment.

FIG. 7 illustrates the use of a service definition package, in accordance with an embodiment. As shown in FIG. 7, in accordance with an embodiment, each SDP 192, 196 can include a binary 193, 197; a metadata 194, 198 (e.g., the SDP name, service type, version, vendor, or virtualization support metadata such as indicating whether the SDP supports OVAB, EC2, or Native); and one or more plugins 195, 199 that enable the SDP to be used within a PaaS platform or cloud environment.

For example, in accordance with an exemplary embodiment, each SDP can include an assembly, reference, package, archive, or template, which can be used to install a service on a particular virtualization provider (e.g., OVAB); an assembly bundled within the SDP or a reference to an assembly (e.g., an EC2-specific reference); a service management engine (SME) plugin for the service type, which enables platform functionality such as elasticity metric gatherers, or alerts to be used with the service; a plugin for use with a VAB deployer (e.g., OVAB Deployer) during its assembly rehydration process; and other dependency and configuration information, such as scalability limits or whether the service is a multitenant or dedicated service.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After a System Administrator installs the SDP, a Cloud Account Administrator can then use a cloud account administration interface to request for a service of that type.

In accordance with an embodiment, when an SDP is installed into a PaaS platform domain, it is consumed by an SDP Manager 190, which is responsible for obtaining a list of SDPs available to be installed the local system, downloading an SDP if necessary, installing parts of the SDP into the right places, maintaining a list of those SDPs that have been installed, and, if necessary, uninstalling an SDP by uninstalling all of its parts from the places they were previously installed.

In accordance with an embodiment, the SDP manager can interface with other system components by installing an SME plugin to the CPAS, which can then take responsibility for replicating the SME plugin to other CPAS instances in the cluster, installing the VAB assembly 202, 204 into the VAB deployer, interfacing with other tools such as Enterprise Manager to provide a customized console interface for the service if the service provides one, and installing configuration data for the service into the CPAS. Subsequently, during realization 206 of a service, the service 210 can be realized as an instance of those service types defined by the SDP and installed as assemblies in the VAB repository.

Service Management Engine (SME)

Figure 8:
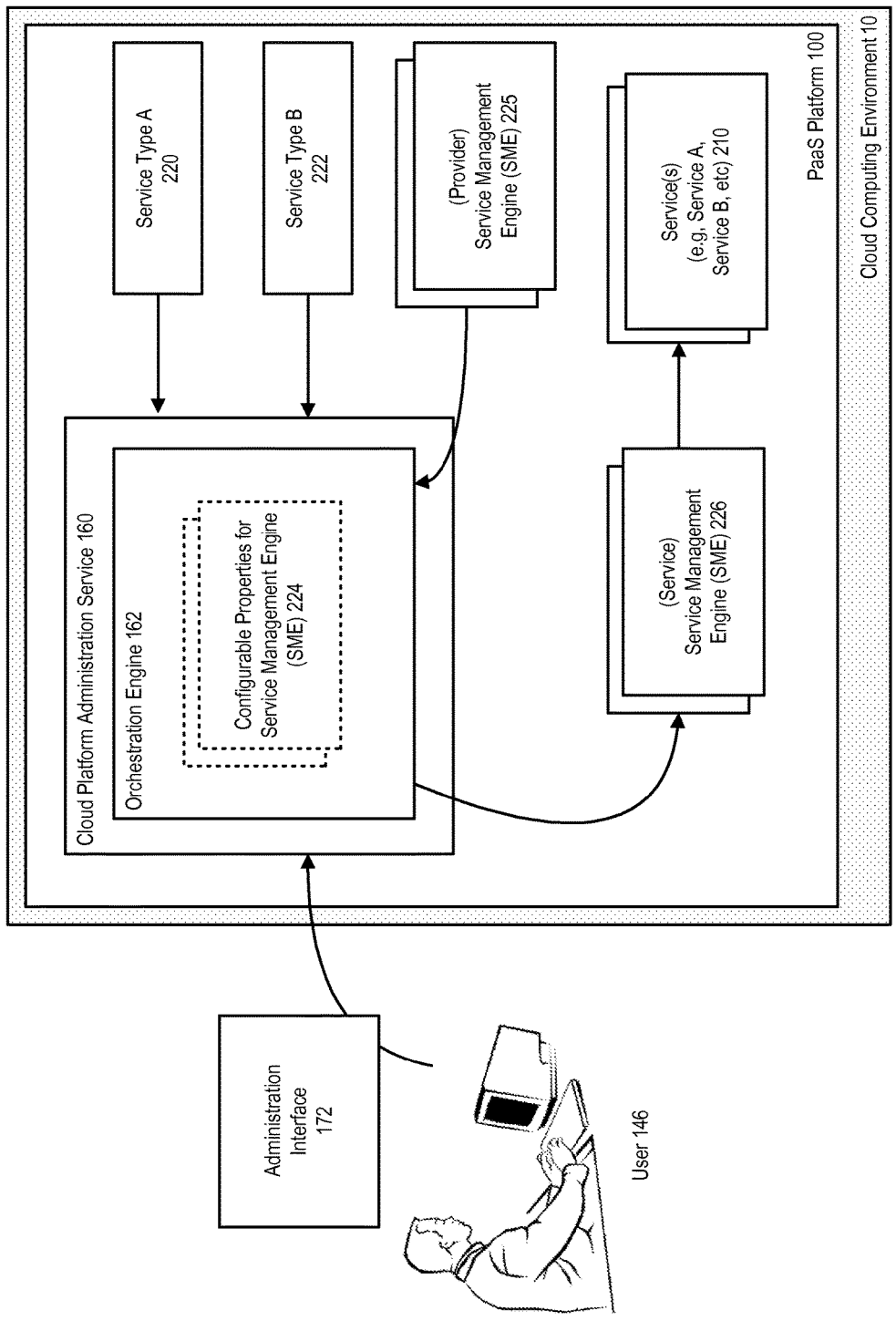
FIG. 8 illustrates the use of a service management engine, in accordance with an embodiment.

FIG. 8 illustrates the use of a service management engine, in accordance with an embodiment. In accordance with an embodiment, a Service Management Engine (SME) provides a generic means to plug any service type into the system. For example, an SME takes care of the service-specific provisioning, lifecycle, management, and monitoring support for a service type or provider type. There can be different classes of SMEs; for example, provider SMEs can be provided to handle different providers. Service SMEs can be dynamically incorporated into the platform domain by installing an appropriate SDP, which are then registered by the SDP manager. The set of registered service SMEs then become the service types that are available to Cloud Account Administrators to create services.

In accordance with an embodiment, each service type supported in the PaaS platform domain maps to a specific service SME. A service SME handles all service-related activities, such as creation, monitoring, management, patching, upgrade, and deletion for that service. In accordance with an embodiment, the contract that is implemented by an SME is referred to as a Service Management Interface (SMI).

Referring to the example shown in FIG. 8, when OVAB is used as a virtualization provider, interaction with the OVAB Deployer can be handled by a virtualization API (e.g., an OVAB client API). In accordance with an embodiment, the orchestration process can then proceed as follows: a Cloud Account Administrator can discover, e.g., SOA service types 220, 222 that are available in the PaaS platform domain, and initiate creation of an, e.g., SOA service. The orchestration engine iterates through the available service SMEs in the system, and determines which service SMEs can handle this service type 224. In this example, the orchestration engine can discover an appropriate SOA SME to handle creation of the SOA service. The orchestration engine can then call into the SME to get all provider dependencies for that SME 225. For example, the SME may return database and load-balancer provider dependencies. The orchestration engine can then call a get-user or similar configurable properties function for the SME, and expose those properties in a user interface, so that the Cloud Account Administrator can edit the properties if desired. User-provided inputs can be supplied to the SME, for example to update an OVAB deployment plan. The orchestration engine then performs any pre-provisioning association between the SME and the provider SMEs upon which it depends. For example, the orchestration engine can perform pre-provisioning association between the SOA SME and a database provider SME, which results in the creation of schema and tables required by the SOA service, in addition to populating the deployment plan with the database provider configuration. When any pre-provisioning association is complete, the orchestration engine can then call into the SME 226 to provision the service.

At this point, the deployment plan is generally complete except for network configurations. In accordance with an embodiment, the deployment plan together with an assembly ID can be pushed, e.g., to the OVAB API, which takes care of filling the deployment plan with the remaining network configurations. Then, the orchestration engine can call, e.g., a Web service API of the OVAB Deployer, to provision the OVAB assembly. Once the assembly is provisioned, the virtual machine information can be retrieved and passed back to the SME, which in turn passes the information back to the orchestration engine. The orchestration engine can then perform any post-provisioning association between the SME and the provider SMEs on which it depends. For example, post-provisioning association between the SOA SME and a load-balancer provider SME may result in the creation of a virtual server to handle and route requests for this SOA service.

Orchestration Engine (OE)

Figure 9:
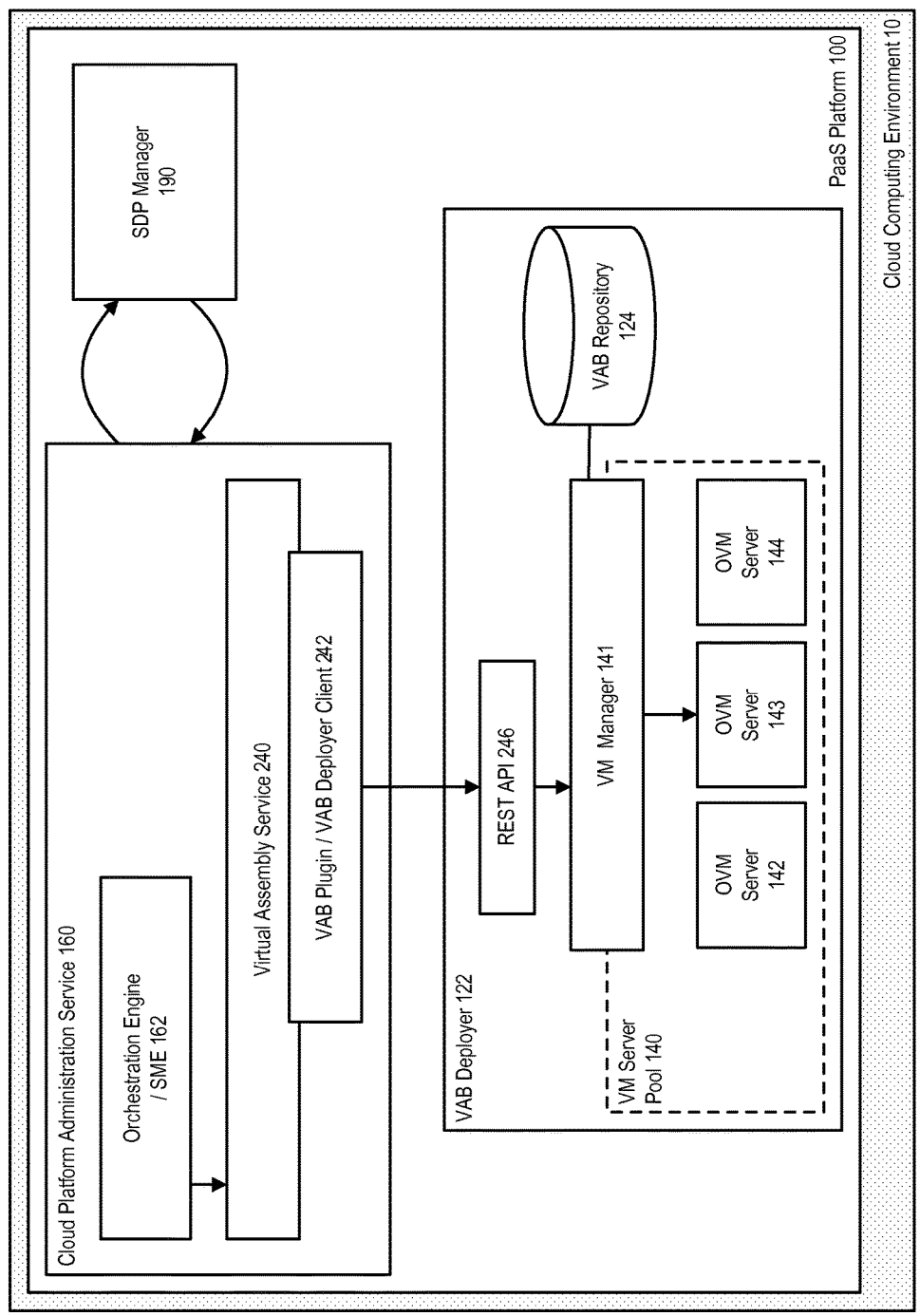
FIG. 9 illustrates the use of an orchestration engine, in accordance with an embodiment.

FIG. 9 illustrates the use of an orchestration engine, in accordance with an embodiment. In accordance with an embodiment, the orchestration engine enables life-cycle management of the services in a PaaS platform. In particular, the orchestration engine coordinates the interactions among various components in the platform domain while creating or managing a service, enables the pluggability of SMEs for various service types in the platform, aids in provisioning the service by selecting appropriate SMEs from among those available in the platform, and helps in managing the configuration of providers such as DB Providers, IDM Providers, and LB Providers.

In accordance with an embodiment, the orchestration engine, as part of creating a service, ensures that dependencies of the service, such as its provider dependencies, are satisfied, by selecting appropriate providers, and coordinating association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the Cloud Account Administrator, including recognizing phases and tasks that match the requirements of the platform for its service creation action, and other life-cycle related activities.

In accordance with an embodiment, the orchestration engine also acts as a gateway for service management, monitoring, scaling actions that could be initiated by other containers in the PaaS platform domain, or by an administrator. For example, the elasticity engine, described in further detail below, can communicate with the orchestration engine to manage, monitor, and scale services based on a service's QoS configuration. The orchestration engine can also play a role in service maintenance actions, such as patching and upgrade, which may require disassociating or re-associating services in a phased manner.

In accordance with an embodiment, services created by a cloud account administrator are visible and accessible only to that particular cloud account (tenant), and are isolated from other cloud accounts in the PaaS platform domain. Such isolation can be provided by the orchestration engine with the help of a cloud account management module.

In accordance with an embodiment, SMEs can be registered with the orchestration engine such that multiple SMEs for a given "family" of service (e.g., "database") can be present in the system. A default SME can also be configured for a particular service family on a per-cloud account basis.

As shown in FIG. 9, in accordance with an embodiment, the orchestration and service management components can interface with the virtualization layer through a virtualization service 240, plugin 242, and virtualization API 246 that abstracts supported virtualization operations. In accordance with an embodiment that uses OVAB, this API can be an OVAB Deployer interface, which enables OVAB Deployer to perform the tasks of assembly creation. In accordance with an embodiment, the orchestration engine/SME can upload and deploys assemblies through the OVAB virtualization API, in addition to managing their lifecycle.

To support developer or demonstration scenarios, in accordance with an embodiment, the system can also implement solutions that run on native OS processes (i.e., with no virtualization). This capability can be implemented by providing a "physical plugin", which implements a portion of the virtualization API.

Elasticity Manager (EM)

Figure 10:
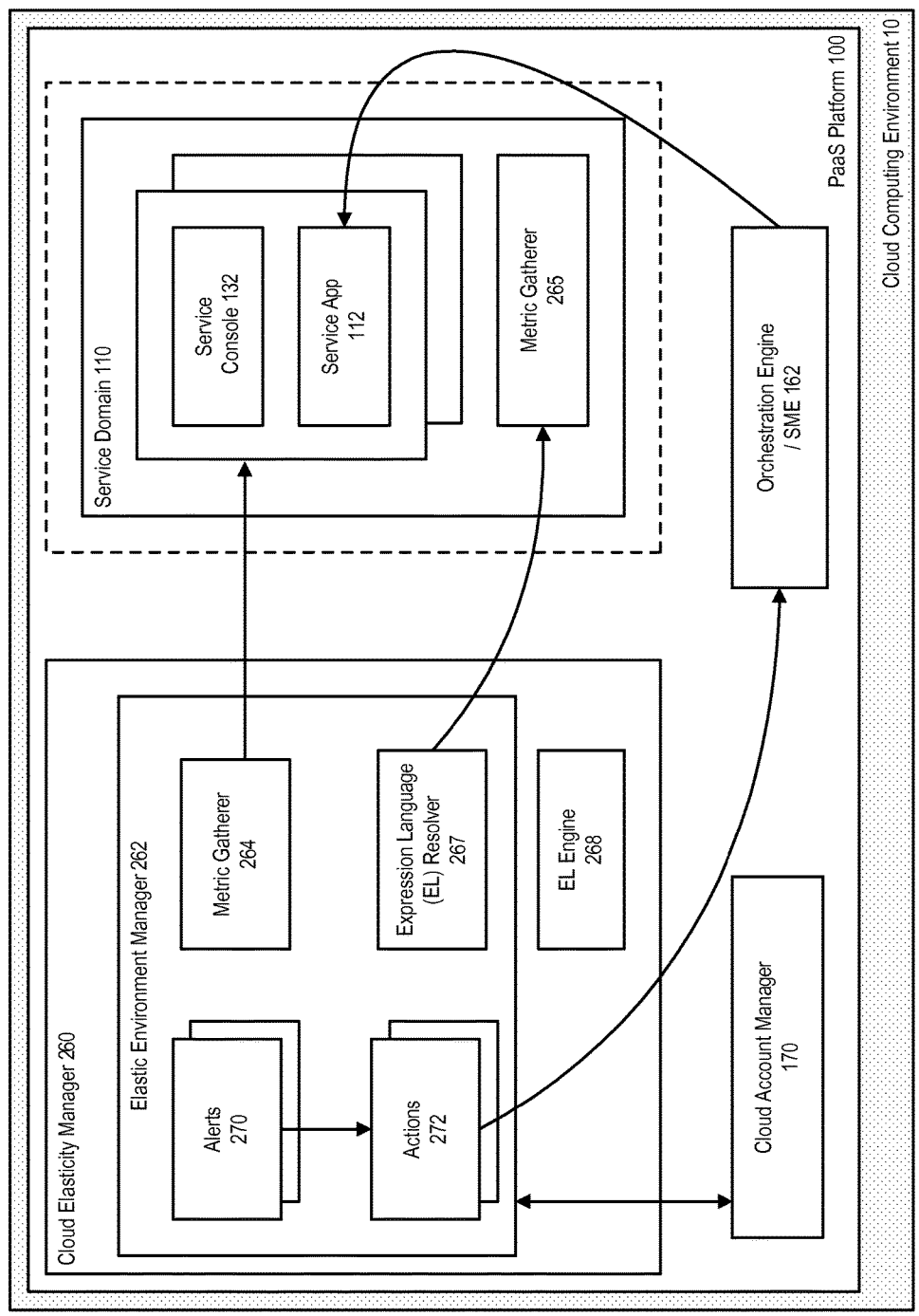
FIG. 10 illustrates the use of an elasticity manager, in accordance with an embodiment.

FIG. 10 illustrates the use of an elasticity manager, in accordance with an embodiment. As shown in FIG. 10, in accordance with an embodiment, the elasticity manager 260, including an environment manager 262, can use metric gatherers 264, 265 and alerts 270, e.g., as HK2 contracts, to determine the health of services running in an environment. Once the state of the environment is determined, the elasticity manager can take appropriate actions 272.

In accordance with an embodiment, a metric gatherer is an object that collects and maintains metric data about a service periodically. For example, a metric gatherer may periodically collect heap statistics such as used or committed memory; or metrics regarding CPU usage. Generally, the metric gatherers provide information about the state of some resource usage. Metrics can also be provided by external monitoring tools, for example by a Java bean component.

In accordance with an embodiment, an alert object periodically checks the health of a service in an environment, by analyzing metric data gathered by one or more metric gatherers over a period of time. For example, an alert may examine CPU usage for a previous several minutes to determine if the environment is under stress. After the alert determines the state of the service or environment, it can execute an action, such as sending an email, logging a message, sending an event, or scaling-up or scaling-down a service. In accordance with an embodiment, an alert can take multiple actions.

In accordance with an embodiment, the elasticity manager can include a unified Expression Language (EL) engine 268, which allows alerts and metric gatherers to be specified as EL expressions. In accordance with an embodiment, the elasticity manager allows external EL Resolver objects 267 to be registered, which enables other types of objects, such as MBeans or POJOs, to be used in an expression.

Update and Patching of SDPs

In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates. In accordance with an embodiment, an update is defined to be a change which has to be made to the system; examples of which include application of a security patch, upgrade of a component, or changing of a configuration value. Depending on the type of update, some updates may require a service or system downtime, while other updates may not require a downtime; and each of these scenarios can be taken into account.

Association of Cloud Services with a Database

In accordance with an embodiment, a system includes a service management engine (SME) configured to execute in the cloud environment and to access a provider type including coordinates to a database and authentication information for the database. When a service deployed to the cloud environment requests use of a database, the provider type can trigger creation of the database and a schema for use by the associated provider. In accordance with an embodiment, the provider type can include coordinates to a container database (CDB) and authentication information for the CDB. When a service deployed in the cloud environment requests a database, the provider type can trigger creation, via the CDB, of a pluggable database (PDB), with a schema for use by the service.

Figure 11:
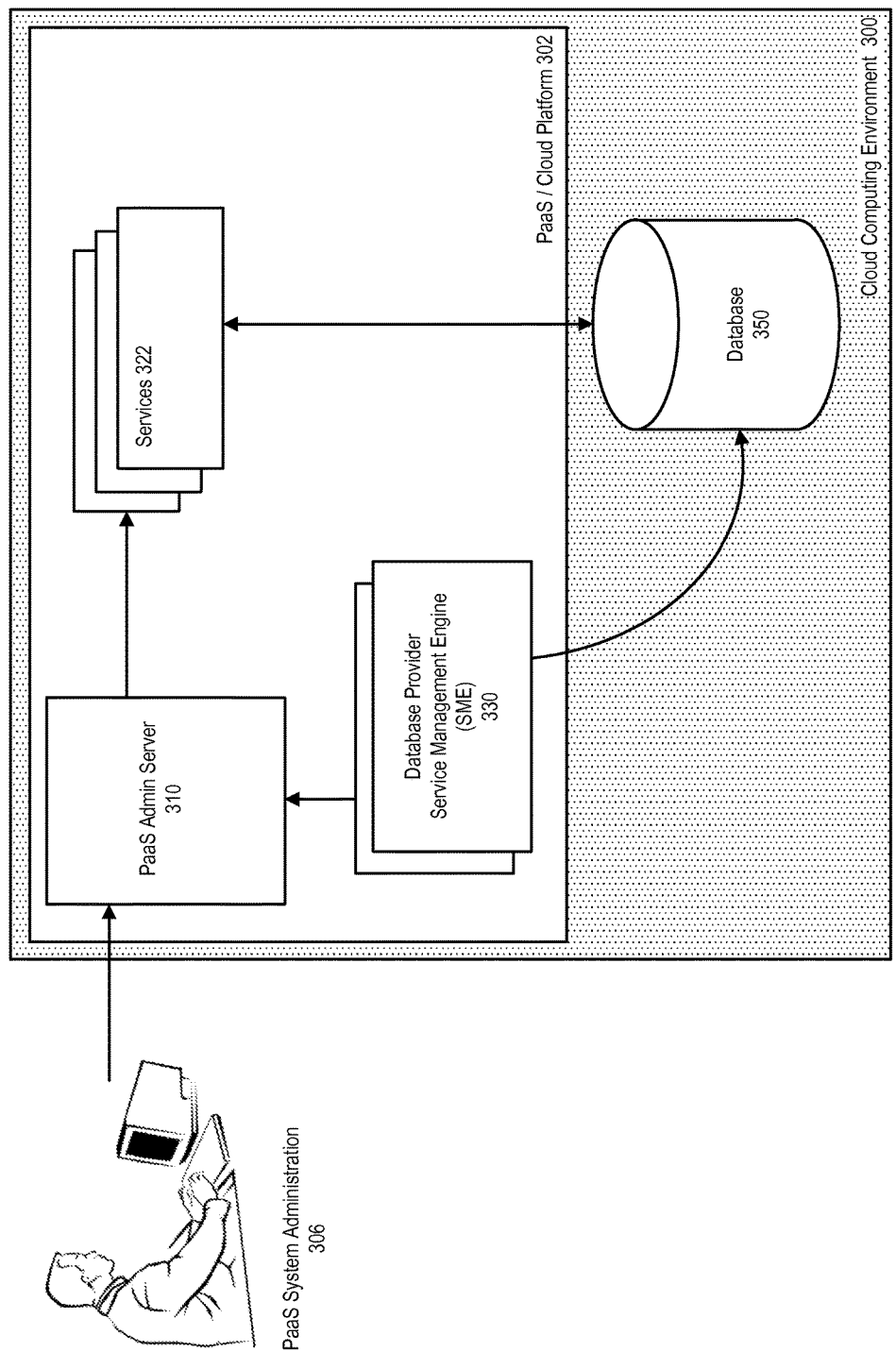
FIG. 11 illustrates a service management engine (SME) for integrating a database with an application server, in accordance with an embodiment.

FIG. 11 illustrates a service management engine (SME) for integrating a database with an application server, in accordance with an embodiment. As shown in FIG. 11, in accordance with an embodiment, in a cloud environment 300 which allows access by a PaaS administration 306, a database provider SME 330 can be used to support service(s) 322 deployed on a cloud platform 302, by integrating a database 350 with an application server on which the cloud platform is deployed.

In accordance with an embodiment, a provider type for the database provider SME can be configured with the coordinates of a database and the authentication information required for the database. When a service needs a database, a provider type for the SME determines that a new database be created with a schema (account) for use by the service, and stores the resulting information in the created provider instance. When the service is associated with the provider, it creates a provider association resource object that tracks the way in which the service is using the provider.

Figure 12:
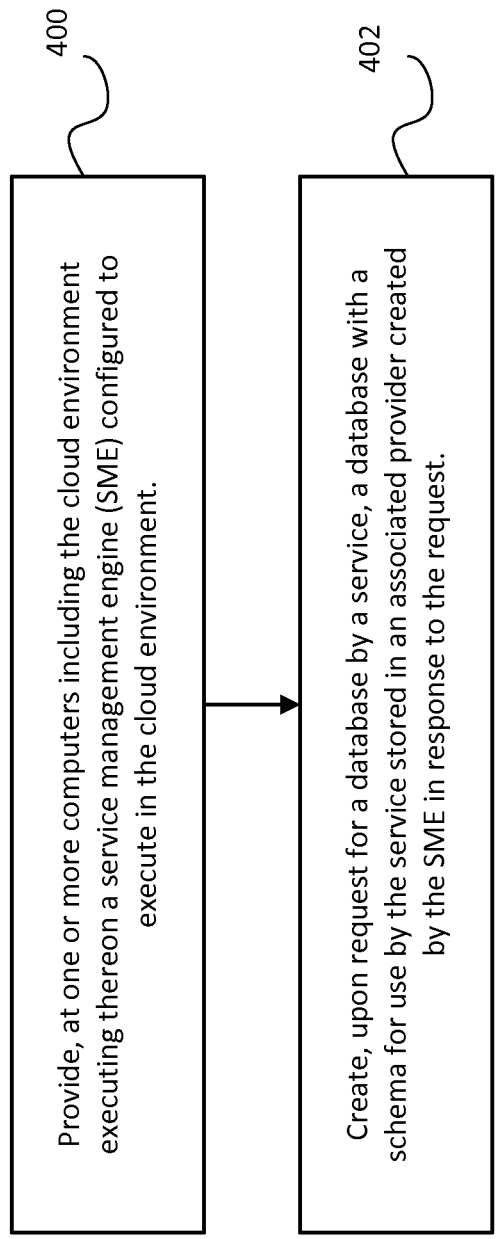
FIG. 12 illustrates a method for integrating a database into a cloud computing environment, in accordance with an embodiment.

FIG. 12 illustrates a method for integrating a database into a cloud computing environment, in accordance with an embodiment. As shown in FIG. 12, in accordance with an embodiment, a method for integrating a database into a cloud computing environment includes providing, at one or more computers including the cloud environment executing thereon a service management engine (SME) configured to execute in the cloud environment (Step 400). In accordance with an embodiment, the SME is configured to access a provider type including coordinates to a database and authentication information for the database. Upon request for a database by a service, a database is created with a schema for use by the service stored in an associated provider created by the SME in response to the request (Step 402).

Pluggable Database Support

In accordance with an embodiment, the system can include support for pluggable databases (PDBs). A PDB can enable a database to contain a portable collection of schemas, schema objects, and nonschema objects that appear to a user as a separate database. In accordance with an embodiment, a container database (CDB) can include zero, one, or many user-created PDBs.

In accordance with an embodiment, a provider type for the SME can be configured with the coordinates of a CDB and the authentication information required for the CDB. When a service needs a database from the SME, the provider type for the SME determines that a new PDB database be created with a schema (account) for use by the service, and stores the resulting information in the created provider instance.

Figure 13:
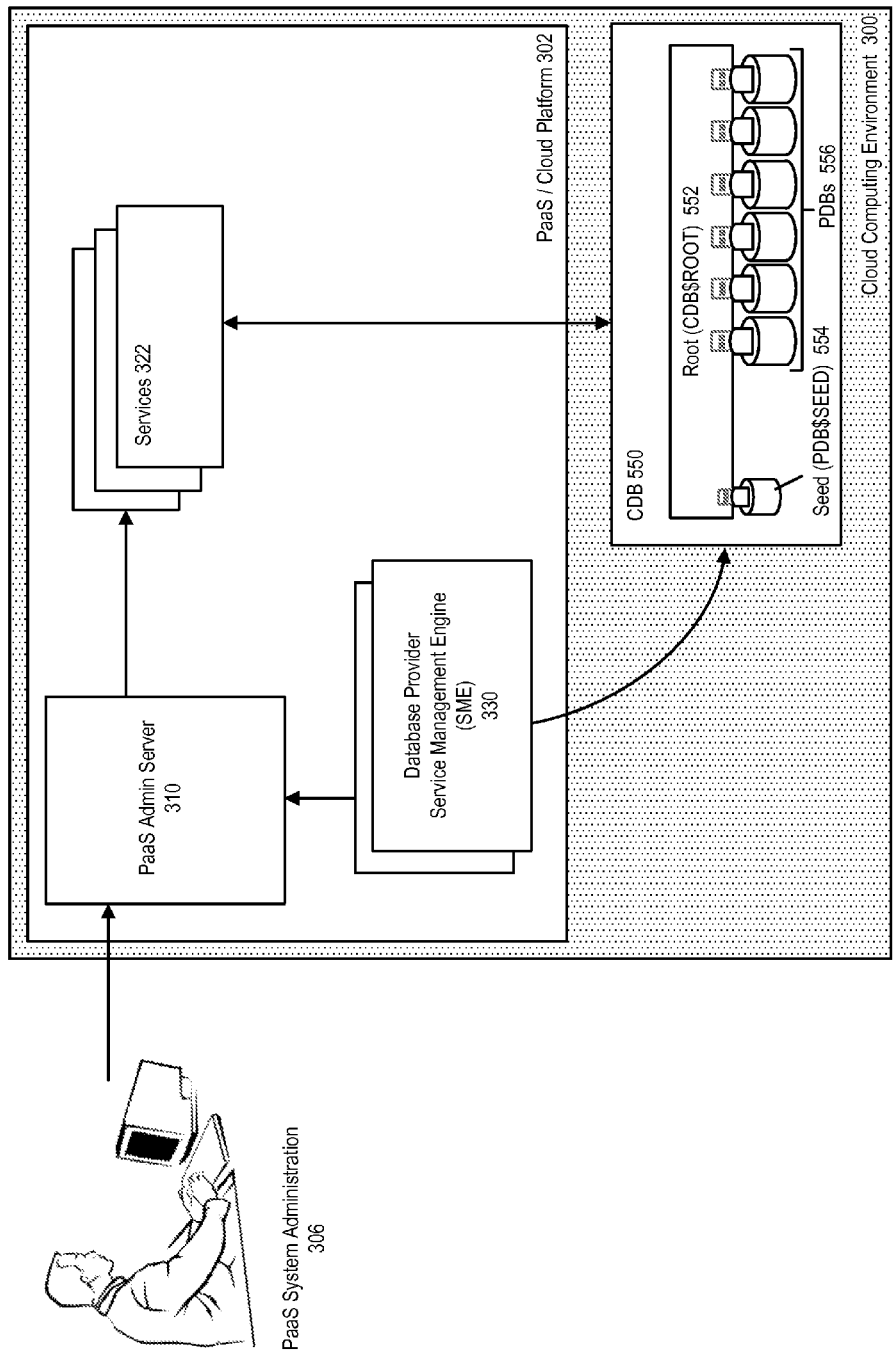
FIG. 13 illustrates a SME for integrating a pluggable database (PDB) with an application server via a container database (CDB), in accordance with an embodiment.

FIG. 13 illustrates a SME for integrating a pluggable database (PDB) with an application server via a container database (CDB), in accordance with an embodiment. In accordance with an embodiment, a CDB 550 is shown including a root 552 and a seed 554, and multiple PDBs 556. The root, named CDB$ROOT, is a collection of schemas, schema objects, and nonschema objects to which all PDBs belong. A CDB has one root, and each PDB is a child of the root. The seed, named PDB$SEED, is a template that can be used to create new PDBs. However, objects cannot be added to the seed and objects in the seed cannot be modified.

In accordance with an embodiment, the PDB appears to users and applications as if it were a non-CDB. For example, a PDB can contain the data and code required to support a specific application.

In accordance with an embodiment, each of the components is a container having a unique container ID within a CDB. For example, a PDB has a globally unique identifier (GUID). The PDB GUID is primarily used to generate names for directories that store the PDB's files, including, for example, Oracle Managed Files directories.

In accordance with an embodiment, a PDB can be plugged into and unplugged from a CDB. When a PDB is plugged into a CDB, the PDB is associated with the CDB. When a PDB is unplugged from a CDB, the PDB is disassociated from the CDB. An unplugged PDB includes an XML file that describes the PDB and the PDB's files (such as the data files and wallet file). A PDB can be unplugged from one CDB and plugged into a different CDB without altering schemas or applications, but can be plugged into only one CDB at a time.

Common Users

In accordance with an embodiment, a CDB supports common users. A common user is a user that has the same identity in the root and in every existing and future PDB. A common user can log in to the root and any PDB in which it has the common user. Some administrative tasks, such as creating a PDB or unplugging a PDB, must be performed by a common user.

In accordance with an embodiment, a CDB also supports local users. A local user is a user that exists in exactly one PDB.

SME Implementations

In accordance with an embodiment, implementations are added to the SME for a configured provider type. For example, a pluggable database can be created exclusively for a created service when dbType is specified as the application server in the create provider-type command:

```
./padmin createprovidertype -sdp OracleDatabase --properties
  systemUser=xxxxx:systemPassword=xxxxx:hostName=
  xxxx.us.oracle.com:portNumber=1521:databaseName=
    orcl.us.oracle.com:sysUserRole=sysdba:dbType=
    myoracleprovider
```

In accordance with an embodiment, in addition to schema creation, table creation occurs in the pluggable database. The schema/tables created are dropped from the pluggable database instance when a service is terminated, and the pluggable database which was created for the service is deleted.

Database Installations as an 'External' Provider

In accordance with an embodiment, an account administrator can be allowed to point to an existing database installation in the enterprise as the target for the provider dependency of a service. The database supplied is used to create schemas. Further, coordinates of a PDB which already exists can be provided. The PDB will be treated like a normal database instance and schemas will be created.

```
padmin create-service-type -sdp JavaServiceSDP JavaEEST
padmin create-provider-type --sdp OracleDatabase --properties
systemUser=sys
  :systemPassword=Oracle123:sysUserRole=sysdba:hostName=
  10.229.142.55:cadmin create-service --account a1 --environment e
    --servicetype JavaEEST fooservice
```

Databases (Non-Shared Virtualized DB) as a Service Resource

As described above, in accordance with an embodiment, a service resource is a specialization of a service. Unlike services, which are only created by explicit action of a cloud account administrator, and providers that are created on demand to satisfy the dependencies of artifacts (applications) deployed to services, a service resource may be associated or disassociated with a service after the service has been created.

In accordance with an embodiment, a service resource type is a special kind of service type that supports "service resources" instead of services. Service resource types are created by the system administrator in the same way as service types. Additional configuration information can be supplied by the system administrator. Multiple service resource types can be created from a single SDP by making different configuration choices.

In accordance with an embodiment, single CDB server can be provided in which each PDB service gets a complete virtualized database within that CDB server. The service resource type for this SME is configured with the coordinates creates a service resource type pointing to a application service CDB installation.

```
# creates a service resource type pointing to a 12c CDB installation
$ padmin create-service-resource-type -sdp OracleDBSDP --properties
    (...information pointing a 12c CDB) My12cDBType
```

In accordance with an embodiment, when a service needs a database, the service resource SME uses the dbhost and dbuser properties to connect to the CDB database server, and request that a new PDB database be created with a schema resource instance:

```
# creates a Java Service Type
$ padmin create-service-type -sdp JavaServiceSDP --properties (...)
JS1Type
# creates a Java Service
$ cadmin create-service
servicetype
JS1Type JS1
# since no specific matching requirements are specified for the Database
dependency of Java Service, OE would automatically match
My12cDBType, and create a service resource instance (a PDB) from it,
and associate that with JS1
```

Database (Shared Virtualized DB) as a Service Resource

In accordance with an embodiment, there may be use cases where an administrator wants to refer to a service resource instance or an account/schema by name to be used to satisfy artifact dependencies of a service:

```
# creates a service resource type pointing to a 12c CDB installation
$ padmin create-servicere-source-type -sdp OracleDBSDP -properties
    (...information pointing a 12c CDB) My12cDBType
```

In accordance with an embodiment, the account admin creates a database service resource instance manually, based on this type. The virtualized database SME allocates a new PDB for the instance. The SME chooses which CDB runtime resulting database service resource instance represents that account in that PDB. The database service resource instance can be given a name by the account admin when it was created:

```
# creates a 'named' instance of a PDB in 12c Runtime, SME will create
the PDB
$ cadmin create-service-resource -service-resource-type My12cDBType
PDB1
```

In accordance with an embodiment, the account admin creates a Java service instance from a Java service type and specifies that a dependency of the Java service instance be satisfied through the named service resource instance:

```
# creates a Java Service Type
$ padmin create-service-type -sdp JavaServiceSDP -properties (...)
JS1Type
```

```
# assign PDB1 as the database to use by applications deployed to a Java
    Service instance JS1
$ cadmin create-service -service-type JS1Type -dependencies
    databasedependency=PDB1 JS1
# assign PDB1 as the database to use by applications deployed to a Java
    Service instance JS2
$ cadmin create-service -servicetype JS1Type -dependencies
    databasedependency=PDB1 JS2
```

Support for Existing Database Installations as an 'External' Service Resource

In accordance with an embodiment, in this scenario an account administrator is allowed to point to an existing application server database installation in the enterprise (e.g., an Oracle 11g/12c database installation) as the target for a service-resource dependency of a service. A database supplied here will be used to create schemas. Coordinates of a PDB which already exists can be given, and will be treated like a normal database instance with schemas being created:

```
# creates a service resource type pointing to a 11g Database installation
$ padmin create-service-resource-type -sdp OracleDBSDP
genericExternalDBType
$ cadmin create-service-resource -service-resource-type=
genericExternalDBType
    -properties (...information pointing the 11g installation)
# creates a Java Service Type
$ padmin create-service-type -sdp JavaServiceSDP -properties (...)
JS1Type
# assign My11gDBInstance as the INSTANCE to use to create an
INSTANCE for applications deployed to a Java Service instance JS1
$ cadmin create-service -service-type JS1Type -dependencies
    databasedependency=My11gDBInstance JS1
```

Shared SDP

In accordance with an embodiment, a 'dbType' property in the service-definition.xml of an database (e.g., Oracle DB) provider SDP can be set to the application server (e.g., Oracle12c):

```
<?xml version="1.0" encoding="UTF8"?>
<service-definition xmlns="http://www.oracle.com/ns/cloudlogic/service-
        definition_1_0"
xmlns:xsi="http://www.w3.org/2001/XMLSchemainstance"
xsi:schemaLocation="http://www.oracle.com/ns/cloudlogic/
service-definition_1_0
http://www.oracle.com/ns/cloudlogic/servicedefinition_1_0/
servicedefinition.xsd"
name="OracleDatabase" vendor="Oracle" version="1.0">
<tenancy model="ANY"/>
<characteristics>
<family>Database</family>
<characteristic name="Vendor" value="Oracle"/>
<characteristic name="product" value="Database"/>
<characteristic name="version" value="11.1.0.7.0"/>
</characteristics>
<service-management-engine id=
"com.oracle.cloudlogic.paas.oracledb.provider">
<file>
<location>paas.oracledbprovider.jar</location>
</file>
</servicemanagementengine>
<properties>
</properties>
</servicedefinition>
```

Separate SDP

In accordance with an embodiment, a separate version of the Database Provider SDP can be used where the default values present in this SDP will be for database installation for the application server (e.g., Oracle 12c) using the following service-definition.xml file:

```
<?xml version="1.0" encoding="UTF-8"?>
<service-definition xmlns="http://www.oracle.com/ns/cloudlogic/service-
      definition_1_0"
xmlns:xsi="http://www.w3.org/2001/XMLSchema-instance"
xsi:schemaLocation="http://www.oracle.com/ns/cloudlogic/
service-definition_1_0
http://www.oracle.com/ns/cloudlogic/service-definition_1_0/service-
      definition.xsd"
name="OracleDatabase" vendor="Oracle" version="1.0">
<tenancy model="ANY"/>
<characteristics>
<family>Database</family>
<characteristic name="Vendor" value="Oracle"/>
<characteristic name="product" value="Database"/>
<characteristic name="version" value="12.1.0.1.0"/>
</characteristics>
<service-management-engine id=
"com.oracle.cloudlogic.paas.oracledb.provider">
<file>
<location>paas.oracledbprovider.jar</location>
</file>
</service-management-engine>
<properties>
</properties>
</service-definition>
```

Creating a Container Database

In accordance with an embodiment, one or more CDBs can be created using either the Database Configuration Assistant (DBCA) or the CREATE DATABASE SQL statement:

```
CREATE DATABASE newcdb
USER SYS IDENTIFIED BY sys_password
USER SYSTEM IDENTIFIED BY system_password
EXTENT MANAGEMENT LOCAL
DEFAULT TABLESPACE users
DEFAULT TEMPORARY TABLESPACE temp
UNDO TABLESPACE undotbs1
ENABLE PLUGGABLE DATABASE
SEED
SYSTEM DATAFILES SIZE 125M AUTOEXTEND ON NEXT 10M
MAXSIZE UNLIMITED
SYSAUX DATAFILES SIZE 100M;
```

In accordance with an embodiment, after a CDB is created, it includes the root and the seed. The root contains minimal user data or no user data, and the seed contains no user data.

Creating a Pluggable Database

In accordance with an embodiment, a PDB can be created in a CDB in one or more of the following ways: create the new PDB by using the seed, create the new PDB by cloning an existing PDB, plug an unplugged PDB into a CDB, or create the new PDB by using a non-CDB.

Figure 14:
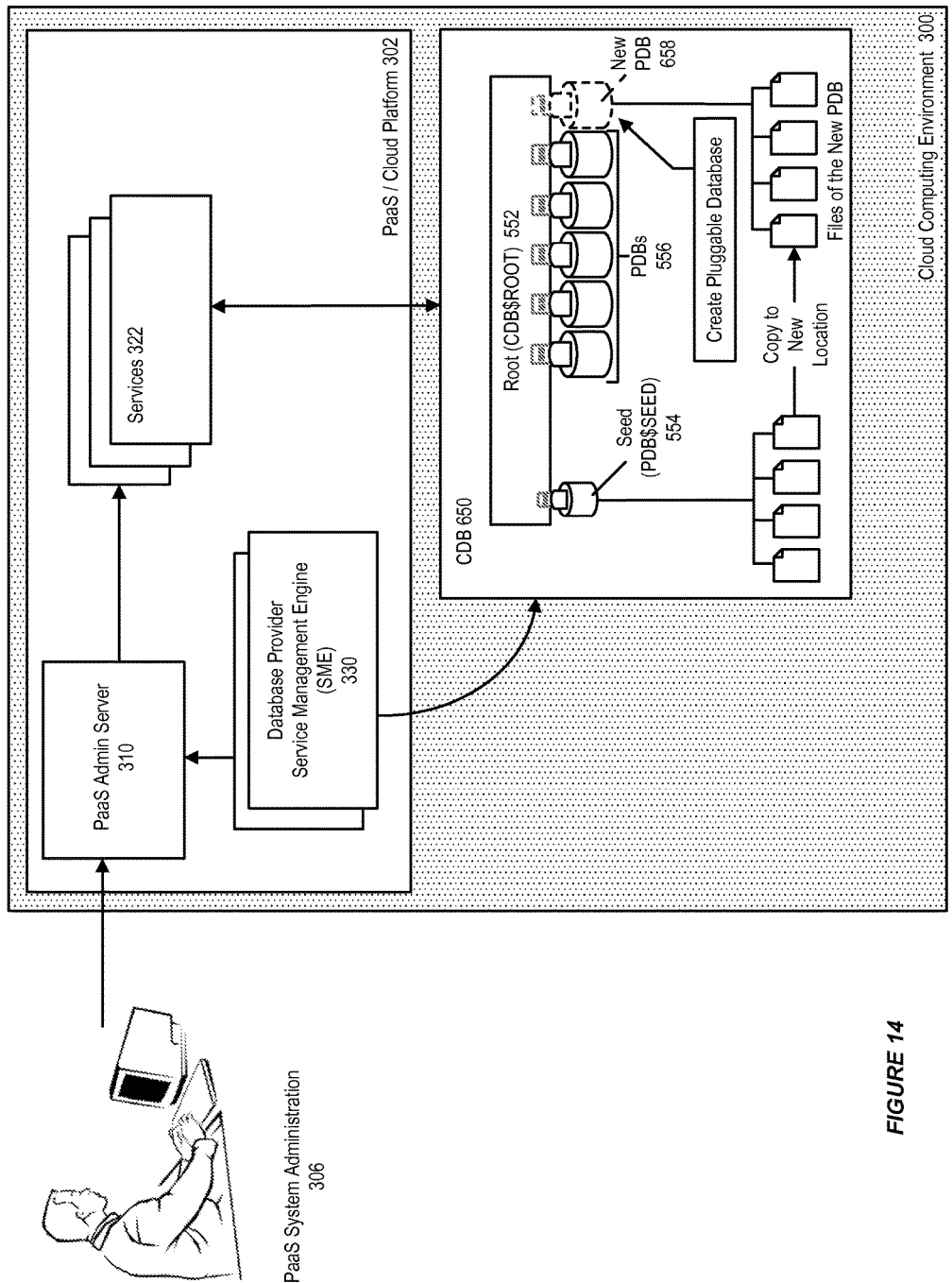
FIG. 14 illustrates the creation of a PDB in a CDB from a seed, in accordance with an embodiment.

FIG. 14 illustrates the creation of a PDB in a CDB from a seed, in accordance with an embodiment. In accordance with an embodiment, the creation of a PDB 658 for a CDB 650 from a seed 554 is shown. A CREATE PLUGGABLE DATABASE statement can be used to create a new PDB 658 by using the files of the seed 454. The statement copies these files to a new location and associates them with the new PDB. A sample SQL statement which creates a PDB from seed can resemble the following:

```
CREATE PLUGGABLE DATABASE salespdb ADMIN USER salesadm
IDENTIFIED BY password STORAGE
(MAXSIZE 2G MAX_SHARED_TEMP_SIZE 100M)
DEFAULT TABLESPACE sales
DATAFILE '/disk1/oracle/dbs/salespdb/sales01.dbf' SIZE 250M
```

```
AUTOEXTEND ON PATH_PREFIX = '/disk1/oracle/dbs/salespdb/'
FILE_NAME_CONVERT = ('/disk1/oracle/dbs/pdbseed/',
'/disk1/oracle/dbs/salespdb/');
```

Figure 15:
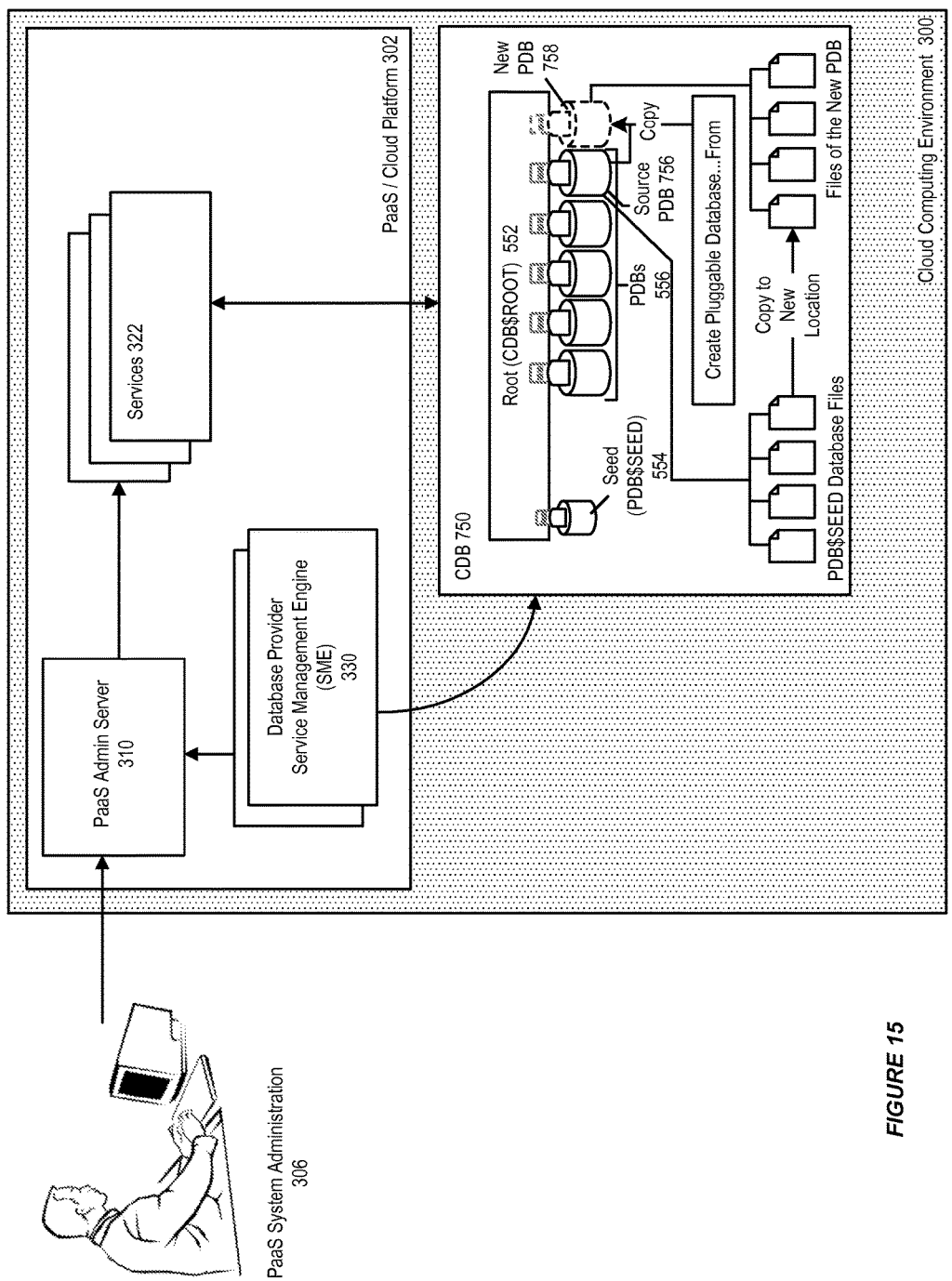
FIG. 15 illustrates the creation of a PDB in a CDB from a source PDB, in accordance with an embodiment.

FIG. 15 illustrates the creation of a PDB in a CDB from a source PDB, in accordance with an embodiment. In accordance with an embodiment, the creation of a PDB 758 for a CDB 750 from an existing PDB 756 is shown. The CREATE PLUGGABLE DATABASE statement can be used to clone the existing PDB. To use this technique, a FROM clause must be included that specifies the source PDB. The source PDB is the existing PDB that is copied. The target PDB is the clone of the source PDB. The source PDB can be in the local CDB or in a remote CDB. The CREATE PLUGGABLE DATABASE statement copies the files associated with the source PDB to a new location and associates the files with the target PDB.

In accordance with an embodiment, one use of PDB cloning is for testing. PDB cloning enables the creation of one or more clones of a PDB so that they can be safely tested in isolation. For example, a new or modified application can be tested on a cloned PDB before using the application with a production PDB.

Figure 16:
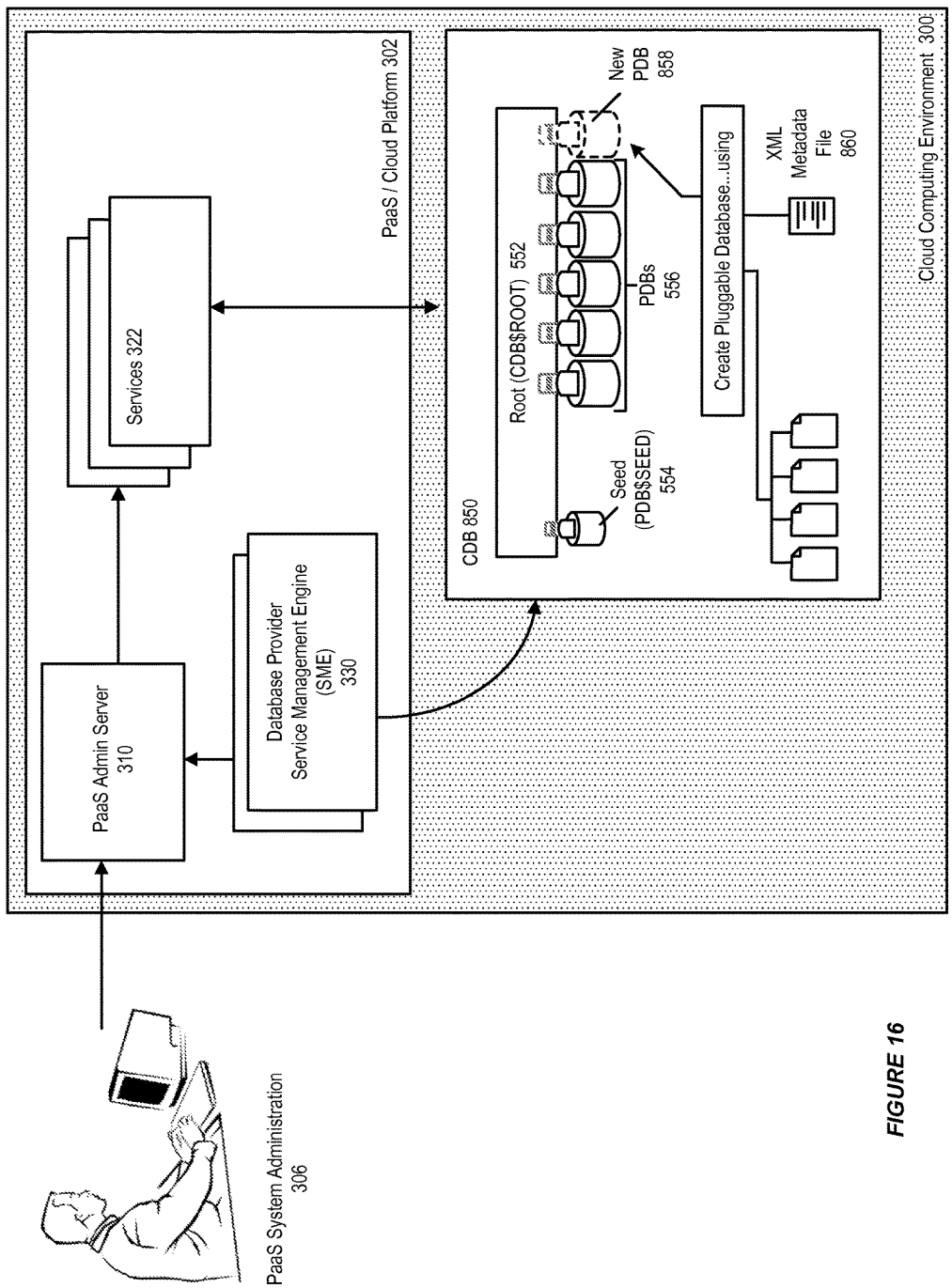
FIG. 16 illustrates the creation of a PDB in a CDB by plugging an unplugged PDB into the CDB, in accordance with an embodiment.

FIG. 16 illustrates the creation of a PDB in a CDB by plugging an unplugged PDB into the CDB, in accordance with an embodiment. In accordance with an embodiment, the creation of a PDB by plugging an unplugged PDB 858 into a CDB 850 is shown. An unplugged PDB comprises an XML metadata file 860 that describes the PDB and files associated with the PDB (such as the data files and wallet file). A USING clause of the CREATE PLUGGABLE DATABASE statement specifies the XML metadata file. The source CDB is the CDB from which the PDB was unplugged. The target CDB is the CDB into which the PDB will be plugged. The source CDB and target CDB can be the same CDB or different CDBs.

Figure 17:
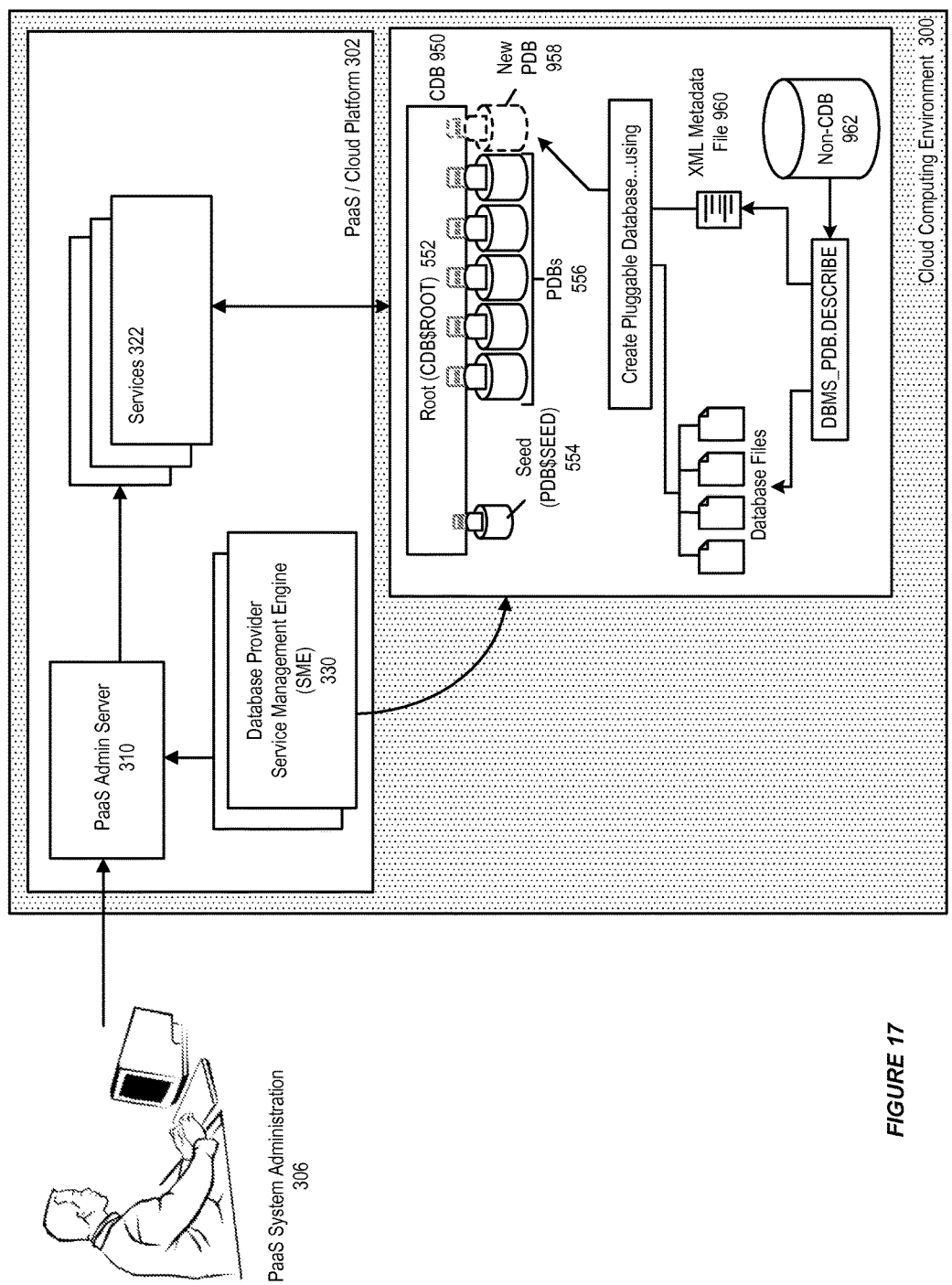
FIG. 17 illustrates the creation of a PDB in a CDB from a non-CDB, in accordance with an embodiment.

FIG. 17 illustrates the creation of a PDB in a CDB from a non-CDB, in accordance with an embodiment. In accordance with an embodiment, the creation of a PDB 958 by using a non-CDB 962 is shown. A DBMS_PDB.DESCRIBE procedure is run on the non-CDB to generate a XML metadata file 960 that describes the database files of the non-CDB. After the XML metadata file is generated, the non-CDB is plugged in in the same way as an unplugged PDB, by specifying the XML metadata file via the USING clause in the CREATE PLUGGABLE DATABASE statement. When the non-CDB is plugged in to a CDB, it is a PDB 958.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for integrating a database into a cloud computing environment, comprising:
   one or more computers including a processor and the cloud computing environment executing thereon;
   at least one service management engine including, for each service type of one or more service types, a service management engine that executes in the cloud computing environment and is associated with the service type and provisions service instances of the service type;
   wherein the one or more service types includes a provider type that is associated with a provider service management engine and provides access information for a database, including coordinates to the database and authentication information for accessing the database; and
   whereupon a service that is deployed in the cloud computing environment requests that a database instance be associated with the service, the provider service management engine
      uses the provider type to create the database instance and a schema for use by the service,
      wherein the database instance is then associated with the service.

2. The system of claim 1, wherein the provider type includes coordinates to a container database (CDB) and authentication information for the CDB;
   wherein when the service deployed in the cloud environment requests a database, the provider type triggers creation, via the CDB, of a pluggable database (PDB).

3. The system of claim 1, wherein when the service is associated with a provider, the service creates a provider association resource object that tracks use of the provider by the service.

4. The system of claim 1, wherein the provider type triggers creation of a table in the database.

5. The system of claim 4, wherein upon termination of the service, the provider service management engine (SME) drops the schema and the table from the database.

6. The system of claim 2, wherein the provider type triggers creation of a table in the PDB.

7. The system of claim 6, wherein upon termination of a service, the provider service management engine (SME) drops the schema and the table from the PDB and deletes the PDB.

8. A method for integrating a database into a cloud computing environment, comprising:
   providing, at one or more computers including the cloud computing environment executing thereon,
      at least one service management engine including, for each service type of one or more service types, a service management engine that executes in the cloud computing environment and is associated with the service type and provisions service instances of the service type,
      wherein the one or more service types includes a provider type that is associated with a provider service management engine and provides access information for a database, including coordinates to the database and authentication information for accessing the database; and
   upon receiving a request that a database instance be associated with a service that is deployed in the cloud computing environment,
      using the provider type to create the database instance and a schema for use by the service, and
      associating the database instance with the service.

9. The method of claim 8, wherein the provider type includes coordinates to a container database (CDB) and authentication information for the CDB; and further comprising:
   creating, upon request for a database instance by the service, a pluggable database (PDB) via the CDB with a schema for use by the service.

10. The method of claim 8, further comprising:
    creating, via the service, a provider association resource object that tracks use of a provider by the service.

11. The method of claim 8, further comprising:
    creating, upon trigger by the provider type, a table in the database.

12. The method of claim 11, further comprising:
    dropping the schema and the table from the database upon termination of the service.

13. The method of claim 9, further comprising:
    creating, upon trigger by the provider type, a table in the PDB.

14. The method of claim 13 further comprising:
    dropping the schema and the table from the PDB upon termination of a service; and
    deleting the PDB.

15. A non-transitory computer readable storage medium, including instructions stored thereon which when read and executed by one or more computers cause the one or more computers to perform the steps comprising:
    providing, at one or more computers including the cloud computing environment executing thereon,
       at least one service management engine including, for each service type of one or more service types, a service management engine that executes in the cloud computing environment and is associated with the service type and provisions service instances of the service type,
       wherein the one or more service types includes a provider type that is associated with a provider service management engine and provides access information for a database, including coordinates to the database and authentication information for accessing the database; and
    upon receiving a request that a database instance be associated with a service that is deployed in the cloud computing environment,
       using the provider type to create the database instance and a schema for use by the service, and
       associating the database instance with the service.

16. The non-transitory computer readable storage medium of claim 15, wherein the provider type includes coordinates to a container database (CDB) and authentication information for the CDB;
   wherein the non-transitory computer readable storage medium further includes instructions stored thereon which when read and executed by one or more computers cause the one or more computers to perform the steps further comprising:
   creating, upon request for a database by the service, a pluggable database (PDB) via the CDB.

17. The non-transitory computer readable storage medium of claim 15, wherein the non-transitory computer readable storage medium further includes instructions stored thereon which when read and executed by one or more computers cause the one or more computers to perform the steps further comprising:
   creating, via the service, a provider association resource object that tracks use of the provider by the service.

18. The non-transitory computer readable storage medium of claim 15, wherein the non-transitory computer readable storage medium further includes instructions stored thereon which when read and executed by one or more computers cause the one or more computers to perform the steps further comprising
   creating, upon trigger by the provider type, a table in the database; and
   dropping the schema and the table from the database upon termination of the service.

19. The non-transitory computer readable storage medium of claim 16, wherein the non-transitory computer readable storage medium further includes instructions stored thereon which when read and executed by one or more computers cause the one or more computers to perform the steps further comprising:
   creating, upon trigger by the provider type, a table in the PDB.

20. The non-transitory computer readable storage medium of claim 19 wherein the non-transitory computer readable storage medium further includes instructions stored thereon which when read and executed by one or more computers cause the one or more computers to perform the steps further comprising:
   dropping the schema and the table from the PDB upon termination of the service; and
   deleting the PDB.

\* \* \* \* \*